United States Patent
Daly

(10) Patent No.: US 9,292,448 B2
(45) Date of Patent: Mar. 22, 2016

(54) DYNAMIC SIZING OF MEMORY CACHES

(71) Applicant: Google Inc., Mountain View, CA (US)

(72) Inventor: Fergal Michael Daly, Tokyo (JP)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 14/032,170

(22) Filed: Sep. 19, 2013

(65) Prior Publication Data

US 2015/0081978 A1   Mar. 19, 2015

(51) Int. Cl.
*G06F 12/08*   (2006.01)
*G06F 12/12*   (2006.01)

(52) U.S. Cl.
CPC ........ *G06F 12/0871* (2013.01); *G06F 12/0895* (2013.01); *G06F 12/12* (2013.01)

(58) Field of Classification Search
CPC . G06F 9/5083; G06F 12/0253; G06F 12/123; G06F 2201/86
USPC .......................................... 711/133, 156, 171
See application file for complete search history.

(56) References Cited

U.S. PATENT DOCUMENTS

| | | | |
|---|---|---|---|
| 5,710,907 | A | 1/1998 | Hagersten et al. |
| 5,875,461 | A | 2/1999 | Lindholm |
| 6,000,017 | A | 12/1999 | Hayek et al. |
| 6,108,754 | A | 8/2000 | Lindholm |
| 6,122,708 | A | 9/2000 | Faraboschi et al. |
| 8,312,219 | B2 | 11/2012 | Cher et al. |
| 2006/0143394 | A1* | 6/2006 | Petev et al. .................... 711/133 |
| 2010/0235329 | A1 | 9/2010 | Koren et al. |
| 2012/0133964 | A1 | 5/2012 | Hayakawa |
| 2012/0144092 | A1 | 6/2012 | Hsieh et al. |
| 2012/0179882 | A1* | 7/2012 | Bernhard et al. ............. 711/156 |
| 2013/0061250 | A1 | 3/2013 | Kothandapani et al. |

OTHER PUBLICATIONS

8JAPPS, "Cache-Manager Pro", Version 2.3, Jun. 22, 2013.
Partho, "Top 10 Java Caching Sotware", Gaea Times, May 12, 2009, available via the Internet at http://tech.gaeatimes.com/index.php/archive/top-10-java-caching-sotware/ (last visited Sep. 19, 2013).
M. Pronschinske, "Terracotta Says 'Goodbye Java GC, Hello BigMemory'", DZone, Sep. 14, 2010, available via the Internet at http://java.dzone.com/terracotta-releases-bigmemory (last visited Sep. 19, 2013).

(Continued)

*Primary Examiner* — Michael Alsip
(74) *Attorney, Agent, or Firm* — McDonnell Boehnen Hulbert & Berghoff LLP

(57) ABSTRACT

Disclosed are cache management apparatus and methods. A mobile device can include a global cache manager (GCM), a processor, and a storage medium. The GCM can manage a cache for an application of the mobile device. The storage medium can store instructions that, upon the processor's execution, cause the mobile device to perform functions. The functions can include: receiving an indication of a triggering event related to memory allocated for the application; the GCM responsively determining an amount of memory allocated to the application; the GCM determining whether a memory limit for the application is within a threshold amount of being exceeded by the amount of memory allocated to the application; and responsive to determining that the memory limit for the application is within the threshold amount of being exceeded, instructing the application to cease utilization of a portion of memory allocated to the cache.

22 Claims, 12 Drawing Sheets

(56) References Cited

OTHER PUBLICATIONS

Terracotta.org, "Class Cache Manager", EHCache Documentation, May 17, 2013, available via the Internet at http://ehcache.org/apidocs/net/sf/ehcache/CacheManager.html (last visited Sep. 19, 2013).

Terracotta.org, "How to Size Caches", EHCache Configuration Documentation, Nov. 19, 2011, available via the Internet at http://ehcache.org/documentation/configuration/cache-size (last visited Sep. 19, 2013).

International Searching Authority, International Search Report and Written Opinion for PCT Pat. App. No. PCT/US14/045625, mailed on Oct. 8, 2014.

* cited by examiner

DYNAMIC SIZING OF MEMORY CACHES

BACKGROUND

Unless otherwise indicated herein, the materials described in this section are not prior art to the claims in this application and are not admitted to be prior art by inclusion in this section.

Computing platforms, such as personal computers, tablet computers, laptops, cellular telephones, and other mobile or portable devices can include an operating system to monitor and manage resources and performance. For example, the operating system for a computing platform can provide support for memory management for executing applications. Memory management can be controlled by a memory manager that supports allocation and deallocation of blocks of memory. In some cases, the operating system can terminate an application to reclaim memory when memory is required by the operating system or the computing platform.

SUMMARY

In one aspect, a mobile device is provided. The mobile device includes: a global cache manager, a processor, and a computer-readable storage medium. The global cache manager is configured to manage a cache for one or more applications of the mobile device. The computer-readable storage medium has instructions stored thereon that, upon execution of the instructions by the processor, cause the mobile device to perform functions. The functions include: receiving an indication of a triggering event related to memory allocated for an application of the one or more applications; responsively determining, using the global cache manager, an amount of memory currently allocated to the application; determining, using the global cache manager, whether a memory limit for the application is within a threshold amount of being exceeded by the amount of memory currently allocated to the application; and responsive to determining that the memory limit for the application is within the threshold amount of being exceeded, instructing the application to cease utilization of a portion of memory currently allocated to the cache using the global cache manager.

In another aspect, an article of manufacture is provided. The article of manufacture includes a computer-readable storage medium having instructions stored thereon that, when executed on by a processor, cause the processor to perform functions. The functions include receiving an indication of a triggering event related to memory allocated for an application; responsively determining, using a global cache manager associated with the processor, an amount of memory currently allocated to the application, where the global cache manager is configured to manage a cache of memory for one or more applications, and where the one or more applications include the application; determining, using the global cache manager, whether a memory limit for the application is within a threshold amount of being exceeded by the amount of memory currently allocated to the application; and responsive to determining that the memory limit for the application is within the threshold amount of being exceeded, instructing the application to cease utilization of a portion of memory currently allocated to the cache.

In another aspect, a method is provided. A mobile device receives an indication of a triggering event related to memory allocated for an application. A global cache manager associated with the mobile device responsively determines an amount of memory currently allocated to the application. The global cache manager is configured to manage a cache of memory for one or more applications, where the one or more applications include the application. The global cache manager determines whether a memory limit for the application is within a threshold amount of being exceeded by the amount of memory currently allocated to the application. Responsive to determining that the memory limit for the application is within the threshold amount of being exceeded, the global cache manager instructs the application to cease utilization of a portion of memory currently allocated to the cache.

In even another aspect, a device is provided. The device includes: means for processing; means for receiving an indication of a triggering event related to memory allocated for an application configured to be executed on the means for processing; means for responsively determining an amount of memory currently allocated to the application, where the global cache manager is configured to manage a cache of memory for one or more applications, and where the one or more applications include the application; means for determining whether a memory limit for the application is within a threshold amount of being exceeded by the amount of memory currently allocated to the application; and means for, responsive to determining that the memory limit for the application is within the threshold amount of being exceeded, instructing the application to cease utilization of a portion of memory currently allocated to the cache.

DETAILED DESCRIPTION

Overview

Figure 1:
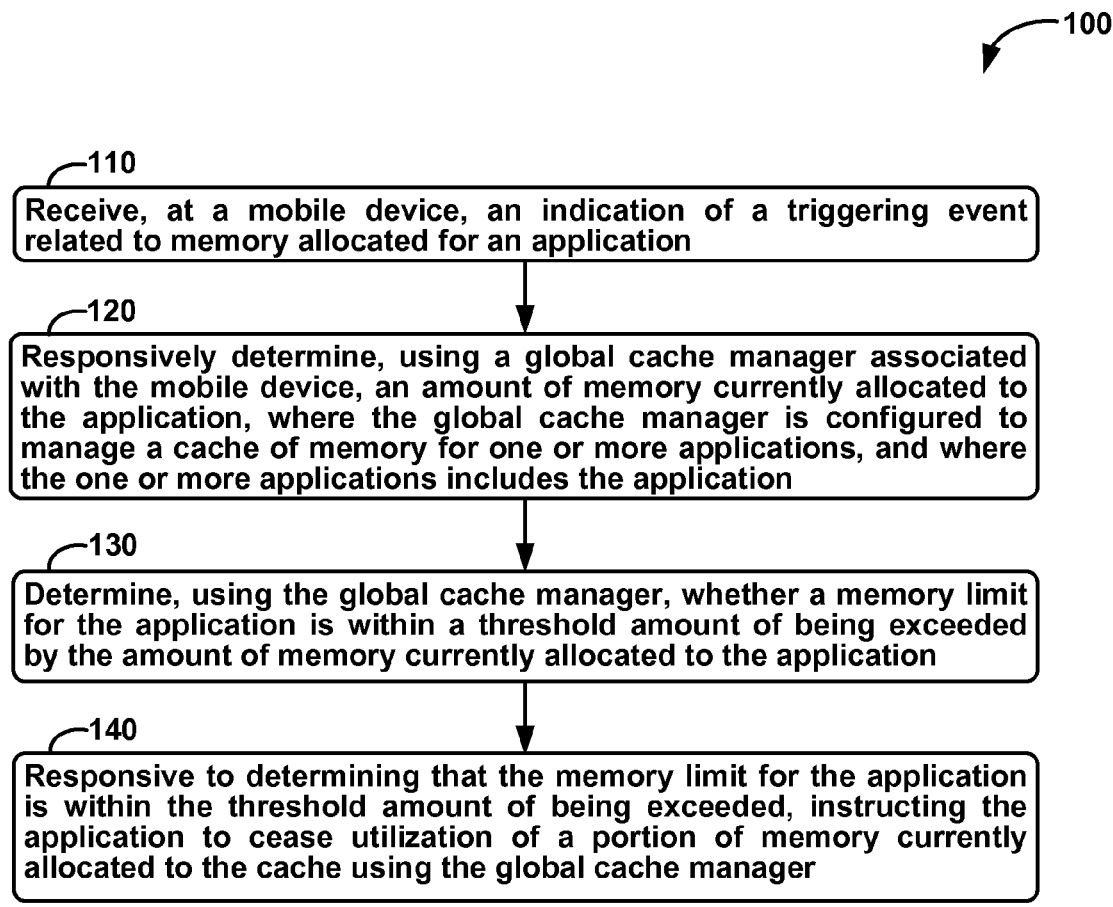
FIG. 1 is a flow chart of a method, in accordance with an example embodiment.

A modern computing device can include an operating system, which is software that manages hardware resources of the computing device and provides common services for computer programs that execute on the computing device. Application programs, or simply applications, can use the services provided by the operating system to carry out one or more tasks.

Some of the services provided by some operating systems enable multiple threads of execution, or multi-threading, to run on the computing device at virtually the same time. For example, the computing device can provide applications with functions for creating, initializing, executing, suspending thread execution, and destroying threads. In some cases, the operating system can support applications that use more than one thread at a time by scheduling threads for execution by processor(s) of the computing device. Each thread can perform one or more tasks for the application, such as but not limited to: performing computations, processing input and/or generating output for the application, handling errors or exceptions, and event processing.

Each thread can use resources to carry out its tasks for the application. In particular, each thread can have a cache of thread-specific memory allocated to the thread. For example, the thread-specific memory can include one or more caches for storing data useful to the thread; e.g., data that is frequently used by the thread; data obtained by the thread utilizing computational and/or network resources. In some scenarios, cache(s) can be directly allocated to the application.

Caches can be implemented using a variety of techniques. One technique is to utilize the cache as a memory pool that can be allocated in any size units; e.g., as performed using the C functions malloc( ), free( ), and realloc( ). Another technique is to structure the cache as a number of fixed-size units or records, and utilize the cache in terms of the fixed-sized units. For example, a cache can be implemented to allocate or deallocate memory in 128-byte sized units. Then, one cache unit can be allocated to store between 0 and 128 bytes of data in the cache, two cache units can be allocated to store between 0 and 255 bytes of data in the cache and so on. As another technique, part of the fixed-sized unit can be allocated to a key, or search term, for searching the cache; this technique can be used in associative caches. Many other cache implementation techniques are possible as well.

Many cache techniques can enable cache growth by request allocation of additional memory to the cache. For example, a cache can start out with 10 kilobytes of storage and later request an additional 10 kilobytes, for a total of 20 kilobytes, to meet demands of an application using the cache. Applications can also request multiple caches; e.g., the application can request allocation of one or more caches per thread utilized to carry out tasks for the application.

Some applications can have a memory limit, or maximum amount of memory that an application can utilize without penalty. If the application utilizes more memory than the memory limit, then the application can be penalized. Example penalties include, but are not limited to: terminating part or all of the application deallocating some or all of the memory allocated to the application, putting the application to sleep (i.e., not allowing the application to execute) for a period of time, putting the application to sleep until an amount of memory is free, or combinations thereof. Other penalties for exceeding a memory limit are possible as well.

A global cache manager can be used to keep one, two, or more applications from exceeding an application-specific memory limit based on triggering events. For example, the global cache manager can receive notifications of triggering events related to memory allocated for an application. One example triggering event can be an insertion event to request to insert or add memory to cache(s) managed by the global cache manager. Another example triggering event is a memory-allocation-notification event notification; e.g., the application has utilized a predetermined amount or percentage of available memory, such as the application has used 1 MB of memory, the application has 512 KB of memory still available, has used 80% of the memory available, or has 15% of memory still available. The notification of memory allocation can provide information about free memory available for all applications; e.g., 2 MB of free memory is available or 95% of free memory is used. For example, the memory-allocation-notification events can be sent to the global cache manager by the operating system and/or the memory manager.

In some embodiments, the global cache manager can be configured to periodically check an amount of memory allocated to the application; e.g., check once every 250 ms, check once per 1-5 seconds. In these embodiments, a notification of expiration of a timer for this periodic memory check can be a triggering event. In all embodiments, other triggering events are possible as well.

Upon receiving a triggering event notification, the global cache manager can determine a current amount of memory being used by the application. Then, the global cache manager can compare the current amount of memory used to a threshold amount of the memory limit. For example, let L be the memory limit for an application, C be the current amount of memory used by the application and let T be a percentage threshold of the memory limit (e.g., T=80%, 90%, 95%, 99%, 100%).

Then, if C is greater than T*L, the memory limit can be in danger of being exceeded, and so the application would be penalized by requesting additional memory. To avoid the penalty, the global cache manager could request that cache(s) under its management cease utilization of a portion of memory used by the cache(s), and so that un-utilized and/or not recently used memory be freed from the application; i.e., via garbage collection. In some embodiments, the global cache manager could request garbage collection if C is greater than T*L; perhaps after waiting for a time period after requesting that cache(s) cease utilization of a portion of memory. In other embodiments, the global cache manager can track recency of cache utilization, and request not-recently-used cache(s) cease utilization of a relatively larger portion of memory than requested from more-recently-used cache(s). If the triggering event is an insertion event, the insertion event can be denied or postponed until enough memory is freed from the application to accommodate insertion of a requested amount of memory specified by the insertion event.

Otherwise, if C is less than T*L, the global cache manager can determine there is no immediate danger of exceeding the memory limit. Then, if the triggering event is an insertion event, the global cache manager can allow the insertion event to take place; e.g., by not denying or postponing the insertion event. In some embodiments, if the triggering event is an insertion event requesting insertion of an amount of memory I, then the current amount of memory used by the application value C can be updated by I; e.g., C=C+I, before comparing the current amount of memory used to the memory limit.

In other embodiments, the above-mentioned threshold value T can be specified as a predetermined amount of memory; e.g., T can be 100 KB, 1 MB, etc. In these embodiments, the memory limit L can be compared to C−T. In particular embodiments, T can be determined a predetermined amount of memory based on a percentage value; e.g., for a memory limit L of 5,000,000 bytes, if T were, for example, 90%, then T*L can be calculated and stored; e.g., 90%*5000000=4500000. Then, in response to triggering events, C can be compared to the stored T*L value.

In still other embodiments, multiple thresholds can be used; e.g., thresholds representing 80%, 90%, and 95% of the memory limit L. Then, the number of cache(s) and/or sizes of the portions of memory for ceasing utilization can be adjusted depending on which threshold(s) are exceeded. For example, if the global cache manager manages three caches—C1 that is very recently used, C2 that is somewhat recently used, and C3 that is not recently used. If the first (80%) threshold is exceeded, the global cache manager can request a first amount of memory; e.g., 5%, from each cache no longer be utilized; and/or request that the least recently used cache (C3) cease utilization of a portion of memory. Then, if the second (90%) threshold is exceeded, the global cache manager can, perhaps in addition to the requests made as the first threshold is exceeded, request a second amount of memory; e.g., 10%, from each cache no longer be utilized; and/or request that at least two least recently used cache (C2 and C3) cease utilization of a portion of memory. In some cases, the amount of memory requested for ceasing utilization can depend on the recency of cache use; e.g., the amount of memory requested for ceasing utilization from C2 can be less than for C3, since C2 has more recently used memory, and so may be more likely to utilize memory in the future. If the third (95%) threshold is exceeded, the global cache manager can, perhaps in addition to the requests made as the first and/or second thresholds are exceeded, request a third amount of memory; e.g., 15%, from each cache no longer be utilized; and/or request that all caches cease utilization of a portion of memory.

The functionality of the global cache manager can rely upon typical processing provided by a memory manager of garbage collected operating system or other system; e.g., a Java Virtual Machine (JVM), to free memory allocated to the application. The global cache manager can rely upon the memory manager to allocate, deallocate, and reclaim memory. Then, global cache manager can be implemented by software that: receives or intercepts insertions, compares current memory usage with memory limits, and reclaims memory as discussed above. If insertions are intercepted, the global cache manager can forward on allowed insertions to an actual destination, and not forward on denied insertions. If insertions are not intercepted, the global cache manager can request or otherwise attempt/carry out memory reclamation for denied insertions and permit allowed insertions to be carried out.

The global cache manager can be implemented using software and/or hardware of a computing device. Global cache manager hardware can be implemented as part of a hardware memory controller, memory device, or related hardware component(s). Global cache manager software can be implemented by applications and/or by the operating system. In some embodiments, the application can use a global cache manager for some or all caches of an application. In other embodiments, the operating system can implement a global cache manager as part of its memory management software. In still other embodiments, the global cache manager can be a dedicated thread or process executing as an application. Many other examples are possible as well. The overall simplicity of global cache manager functionality, as well as the flexibility to work with many memory manager and cache implementations, can ease global cache manager adoption, as well as providing application and system developers the flexibility in designing their caching and memory management software.

Example Operations

Turning to the figures, FIG. 1 is a flow chart of method 100, in accordance with an example embodiment. Method 100 begins at block 110, where a mobile device can receive an indication of a triggering event related to memory allocated for an application, such as discussed below in the context of FIGS. 2A-4C. The application can be configured to be executed on the mobile device. In some embodiments, the triggering event can be an event selected from the group consisting of: an insertion event requesting to insert a requested amount of memory into the cache, a memory-allocation notification event, and a timer expiration event.

At block 120, a global cache manager associated with the mobile device can responsively determine an amount of memory currently allocated to the application, where the global cache manager can be configured to manage a cache of memory for one or more applications, and where the one or more applications includes the application, such as discussed below in the context of FIGS. 2A-4C.

At block 130, the global cache manager can determine whether a memory limit for the application is within a threshold amount of being exceeded by the amount of memory currently allocated to the application, such as discussed below in the context of FIGS. 2A-4C. In some embodiments, the threshold amount can be specified as a predetermined percentage of the memory limit.

At block 140, responsive to determining that the memory limit for the application is within the threshold amount of being exceeded, the global cache manager can instruct the application to cease utilization of a portion of memory currently allocated to the cache, such as discussed below in the context of FIGS. 2A-4C.

In some embodiments, instructing the application to cease utilization of the portion of memory currently allocated to the cache can include instructing the application to cease utilization of a predetermined percentage of the portion of memory currently allocated to the cache. In other embodiments, instructing the application to cease utilization of the portion of memory currently allocated to the cache can include instructing the application to cease utilization of a portion of memory that is least recently used by the cache.

In some embodiments, the mobile device can include a memory manager, where the memory manager is separate from the global cache manager. In particular of these embodiments, the triggering event can include an insertion event requesting to insert a requested amount of memory into the cache. Then, method 100 can further include: responsive to determining that the memory limit for the application is not within the threshold amount of being exceeded, allocating at least the requested amount of memory to the cache using the memory manager.

In other particular of these embodiments, method 100 can further include: after instructing the application to cease utilization of the portion of memory currently allocated to the cache, the memory manager can determine that the application has ceased utilization of the portion of memory and can deallocate the portion of memory.

In specific of these other particular embodiments, the memory manager can include a garbage collector. Then, determining that the application has ceased utilization of the portion of memory can include determining, using the garbage collector, that the application has ceased utilization of the portion of memory; and deallocating the portion of memory can include deallocating the portion of memory using the garbage collector.

In other embodiments, the application can include a plurality of threads where each thread can be configured to perform one or more tasks for the application. The plurality of threads can include a plurality of caching threads, where each caching thread is configured to allocate and utilize a cache to perform the one or more tasks for the caching thread. The plurality of caching threads can include one or more registered caching threads, where each registered caching thread is configured to be registered with the global cache manager. In some of these other embodiments, method 100 can further include: for each registered caching thread, registering the registered caching thread with the global cache manager. Then, instructing the application to cease utilization of the portion of memory currently allocated to the cache can include instructing each registered caching thread of the one or more registered caching threads to cease utilization of a respective portion of its respective cache.

In particular of the other embodiments, the plurality of caching threads can include one or more non-registered caching threads, where each non-registered caching thread of the one or more non-registered caching threads is not registered with the global cache manager.

Example Memory Architectures

Figure 2A:
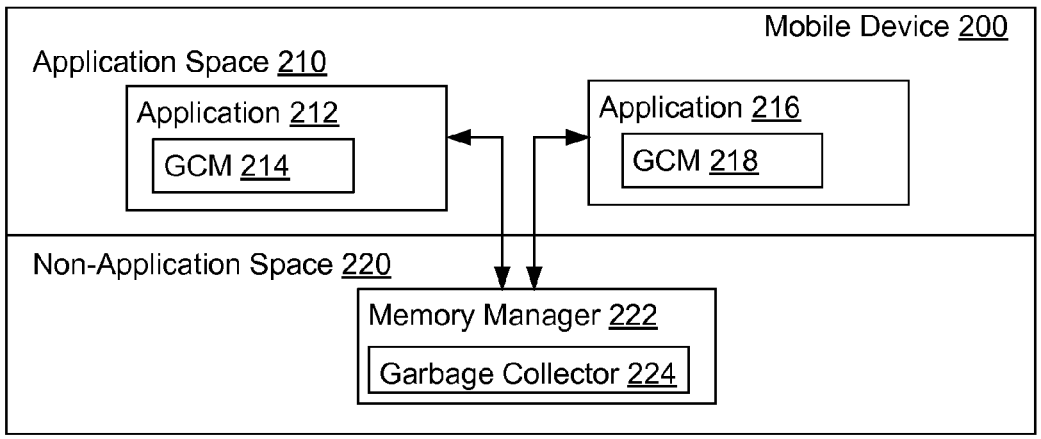
FIGS. 2A, 2B, and 2C are block diagrams of three example memory architectures for computing systems, in accordance with example embodiments.
Figure 2B:
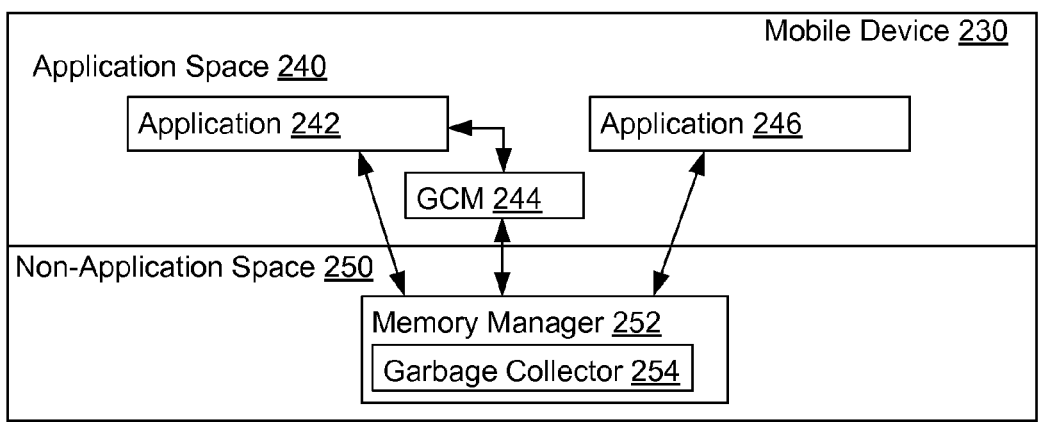
Figure 2C:
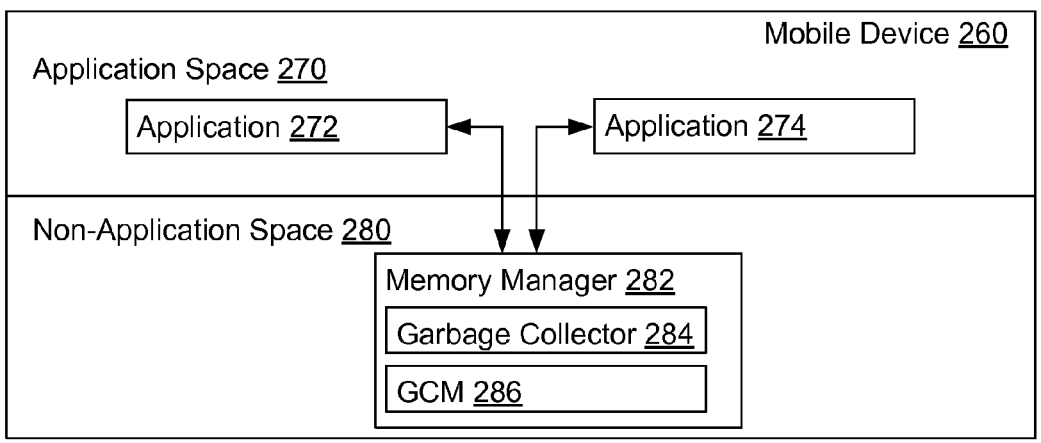

FIGS. 2A, 2B, and 2C are block diagrams of three example memory architectures for computing devices, in accordance with example embodiments.

FIG. 2A shows mobile device 200 with a memory architecture having application space 210 and non-application space 220. The memory architecture can be implemented; for example, in part or all data storage for mobile device 200. Application space 210 can store data for applications that are run on behalf of user(s) of mobile device 210, such as applications 212 and 216. Some applications, such as application 212 and 216, can include a global cache manager (GCM), such as respective global cache managers 214 and 218. Other applications of mobile device 200, which not depicted in FIG. 2A, can be configured to reside and execute in application space 210 without a global cache manager.

In some embodiments, the memory architecture can include memory limits for applications, such as a per-application maximum amount of memory allocatable for the application. In particular, if a maximum amount of memory allocated for an application is exceeded, then the application can be penalized, such as having a portion of the memory deallocated (removed) from the application, the application can put into a temporary non-executable state; e.g., put to sleep, for a period of time, or the application can be terminated. In other particular embodiments, memory reclamation such as garbage collection can be performed when an application requests memory beyond the per-application maximum amount of memory.

Global cache managers 214, 218 can provide functionality to manage locally allocated memory, such as a cache, for an application; e.g., global cache manager 214 can manage locally allocated memory for application 212 and global cache manager 218 can manage locally allocated memory for application 216.

Each global cache manager 214, 218 can receive notifications of events, such as triggering events related to memory allocated for the application. Examples of these events include, but are not limited to, insertions or insertion events, memory-allocation-notification events, and timer expiration events. Insertions can be requests to allocate memory; e.g., for one or more caches managed by the global cache manager.

Memory-allocation-notification events can include notifications from the operating system, memory manager, and/or other source(s) related to memory allocation. Some examples include, but are not limited to, notifications of: a percentage of memory utilized by an application, an amount of memory utilized by an application, a percentage (or amount) of free memory for an application, a percentage (or amount) of memory utilized by a group of applications, a percentage (or amount) of free memory for by a group of applications, a percentage (or amount) of memory utilized within application space 210, a percentage (or amount) of free memory within application space 210, a percentage (or amount) of memory utilized for all purposes by mobile device 200, a percentage (or amount) of free memory for mobile device 200, and combinations thereof.

Each global cache manager 214, 218 can request memory manager 222 and/or the operating system of mobile device 200 (not shown in FIG. 2A) to inform the global cache manager how much memory is used by a specified application; e.g., global cache manager 214 can request information about memory used by application 212 and global cache manager 218 can request information about memory used by application 216. In response to the request, memory manager 222 and/or the operating system can inform the global cache manager how much memory is used by the specified application.

In some embodiments, a global cache manager; e.g., global cache manager 214, can use a timer to periodically request information about memory allocated to application 212. The information about memory used by application 212 can be one of the above-mentioned example notifications related to memory allocation. For example, global cache manager 214 can set a timer for a predetermined period of time (500 ms, 1 second, 2 seconds). Then, upon expiration of the timer, global cache manager 214 can be informed of the timer expiration and responsively request information how much memory is used by a specified application; e.g., application 212. In these embodiments, a timer expiration event that leads to a request for information how much memory is used can be a triggering event to global cache manager 212.

Each global cache manager 214, 218 can determine whether its respective application 212, 216 is approaching, at, or exceeded the memory limit for the application. For example, each global cache manager 214, 218 can request information about how much memory is used by the respective application 212, 216 and can determine the memory limit for the application. Then, a global cache manager; e.g., global cache manager 214, can determine whether its application; e.g., application 212, is approaching its memory limit based on one or more thresholds. For example, suppose that application 212 has a 100 KB memory limit (102,400 bytes), and global cache manager 214 uses an 80% threshold to determine that application 212 is approaching the memory limit. In this example, global cache manager 214 requests information about memory usage by application 212 every second, and in an example five second interval receives the following memory usage values: 76,800 bytes (75 KB), 78,000 bytes (about 76.2 KB), 92,160 bytes (90 KB), 83,456 bytes (81.5 KB), and 80,896 bytes (79 KB). In this example, as the threshold value is 100 KB*80%=80 KB, global cache manager 214 can determine that application 212 is within a threshold amount of exceeding the memory limit when application 212 uses more than 81,920 bytes (80 KB), as indicated by the third usage value of 90 KB, and the fourth usage value of 81.5 KB.

In some embodiments, global cache managers 214, 218 can determine whether an insertion, if granted, will lead to the respective application 212, 216 approaching. Continuing the above example, suppose a cache informs global cache manager 214 of an insertion request for 2 KB of memory. Then, global cache manager 214 can request information about memory usage by application 212, add the requested amount, and see if the sum of the memory used plus the requested amount exceeds the threshold amount. In this example with a 80% threshold of a 100 KB memory limit, if the memory usage value is 78 KB or more, then the sum of the memory usage plus the requested 2 KB amount will exceed the 80 KB threshold value and so global cache manager 214 can determine that honoring the insertion will cause application 212 to approaching its memory limit.

Upon determining an application is approaching, is at, or is exceeding the per-application maximum amount of memory, each of global cache managers 214, 218 can request that each cache managed by the global cache manager can trim (reduce) the amount of memory utilized by the managed request. A trim request can be specified in terms of a percentage of memory utilized, an amount of memory utilized, a range of amounts or percentages of memory utilized, a number of items allocated, or by some other specification of memory utilized.

In some embodiments, global cache managers 214, 218 can communicate with each other; e.g., if global cache manager 214 determines that application 212 is to reduce memory, then global cache manager 214 can communicate with global cache manager 218 to request that application 216 reduce memory as well. Then, after trimming memory from both applications 212 and 216, global cache managers 214, 218 can get information about memory utilized by respective application 212, 216 to determine whether the application is or is not approaching the application's memory limit. If the application is still approaching, is at, or has exceeded the application's memory limit, the respective global cache manager 214, 218 can request additional trimming of memory.

In the above embodiments regarding insertions, after trimming memory, global cache managers 214, 218 can take a sum of memory utilized and amount(s) of memory requested for insertion request(s) to determine whether the respective application 212, 216 has enough memory to satisfy insertion request(s) without approaching the application's memory limit. If the application will approach, be, or exceed the application's memory limit after honoring the insertion request(s), the respective global cache manager 214, 218 can request additional trimming of memory. In some embodiments, the insertion may be sent from application 212 or 216 to global cache manager 214 or 218, respectively, and for allocation simultaneously, and so, global cache manager 214 or 218 need not forward on the insertion.

Non-application space 220 can store data for reserved for systems that control mobile device 210, such as an operating system, virtual machine, e.g., Java Virtual Machine (JVM), and/or other systems. In some cases, non-application space is termed "system space". These systems, such as memory manager 222, can provide support functionality for applications. For example, memory manager 222 can allocate and deallocate memory on behalf of applications 212 and 216. Garbage collector 224 can reclaim memory allocated to applications based on various criteria, such as, but not limited to reclaiming: unused memory, memory not accessed or otherwise utilized within a predetermined period of time, memory allocated to application(s) not utilized within a predetermined period of time, and memory allocation to terminated processes. In some embodiments, part or all of the functionality of garbage collector 224 can be separate from memory manager 222. In particular of these embodiments, part or all of the functionality of garbage collector 224 can be an application, and so can reside in application space 210.

FIG. 2B shows mobile device 230 with a memory architecture having application space 240 and non-application space 250. The memory architecture can be implemented; for example, in part or all data storage for mobile device 230. Application space 240 can store data for applications that are run on behalf of user(s) of mobile device 230, such as applications 242 and 246. For mobile device 230, global cache manager 244 can be executable in application space 240 as an application process or thread distinct from other applications, such as applications 242 and 246. Global cache manager 244 can provide functionality to manage locally allocated memory for an application, such as discussed above for global cache managers 214, 218 in the context of FIG. 2A. In embodiments not shown in FIG. 2B, global cache manager 244 can communicate with application 246 as well.

Non-application space 250 can store data for reserved for systems that control mobile device 230 and provide support functionality for applications, such as memory manager 252, such as discussed above in the context of non-application space 220 and memory manager 222 for FIG. 2A. Garbage collector 254 can reclaim memory allocated to applications such as discussed above in the context of garbage collector 224 for FIG. 2A. In some embodiments, part or all of the functionality of garbage collector 254 can be separate from memory manager 252. In particular of these embodiments, part or all of the functionality of garbage collector 254 can be an application, and so can reside in application space 240.

FIG. 2C shows mobile device 260 with a memory architecture having application space 270 and non-application space 280. The memory architecture can be implemented; for example, in part or all data storage for mobile device 260. Application space 270 can store data for applications that are run on behalf of user(s) of mobile device 260, such as applications 272 and 274.

Non-application space 280 can store data for reserved for systems that control mobile device 260 and provide support functionality for applications, such as memory manager 282, such as discussed above in the context of non-application space 220 and memory manager 222 for FIG. 2A. Garbage collector 284 can reclaim memory allocated to applications such as discussed above in the context of garbage collector 224 for FIG. 2A. In some embodiments, part or all of the functionality of garbage collector 284 can be separate from memory manager 282. In particular of these embodiments, part or all of the functionality of garbage collector 284 can be an application, and so can reside in application space 270.

Global cache manager 286 can provide functionality to manage locally allocated memory for an application, such as discussed above for global cache managers 214, 218 in the context of FIG. 2A. For mobile device 260, global cache manager 286 can reside in non-application space 280. As shown in FIG. 2C, global cache manager 286 can be part of memory manager 282. In other embodiments, global cache manager 286 can reside in non-application space 280 as process or thread from distinct from memory manager 282; e.g., global cache manager 286 can be a separate system process.

Example Caching Applications and Scenarios for Utilizing Caching Applications

Figure 3A:
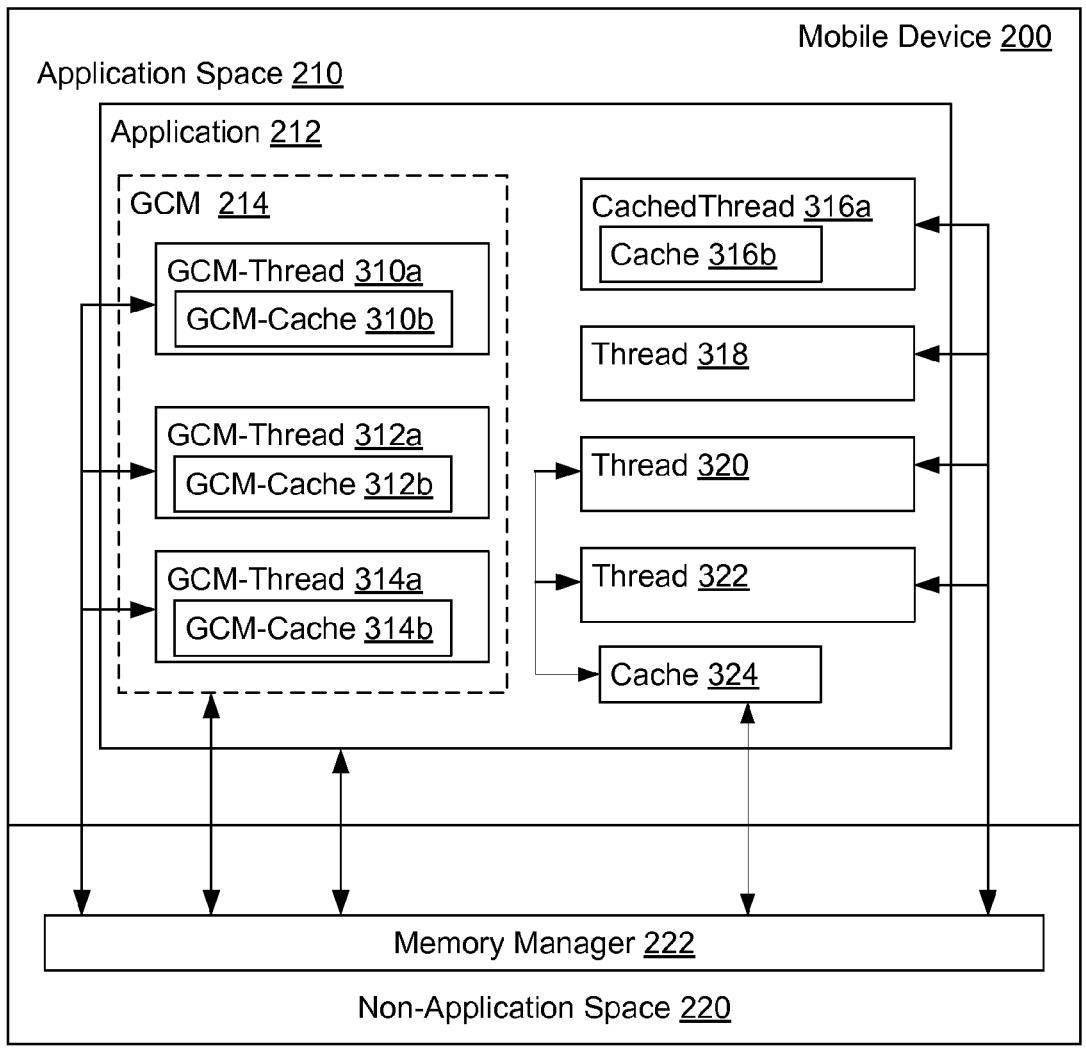
FIG. 3A is a block diagram of an example application utilizing the memory architecture depicted in FIG. 2A, in accordance with an example embodiment.

FIG. 3A is a block diagram of an application 212 utilizing the memory architecture depicted in FIG. 2A for mobile device 200, in accordance with an example embodiment. FIG. 3A shows application 212 resident in application space 210. Application 212 has seven threads 310a, 312a, 314a, 316a, 318, 320, and 322. Of these seven threads, four have caches: cached threads 310a, 312a, 314a, and 316a. Three cached threads 310a, 312a, and 314a have respective caches 310b, 312b, 314b that are managed by global cache manager 214 and one thread 316a with cache 316b that is not managed by global cache manager 214. In some embodiments, more or fewer threads can be allocated to application 212. In other embodiments, more, fewer, or all threads allocated to application 212 can be cached threads. In still other embodiments, fewer cached threads or all cached threads of application 212 can have their respective caches managed by global cache manager 214.

FIG. 3A shows that each thread 310a, 312a, 314a, 316a, 318, 320, 322, application 212, and global cache manager 214 are each configured to communicate with memory manager 222, which is resident in non-application space 220. Each of threads 310a, 312a, 314a, 316a, 318, 320, and 322, application 212, and global cache manager 214 can communicate with memory manager 222 to allocate memory, deallocate memory, utilize (e.g., read and write) memory, request and receive information about memory allocated to one or more applications, such as memory utilization values and/or memory limits, on the thread, global cache manager 214, or application 212, and as needed for other activities, such as utilization of input and output resources of mobile device 200.

Global cache manager 214 is shown in FIG. 3A using a dashed rectangle to indicate that global cache manager 214 can be implemented as functionality that resides in each global-cache-managed-thread 310a, 312a, 314a. In other embodiments, global cache manager 214 can be implemented as a separate thread of application 212 from each global-cache-managed-thread 310a, 312a, 314a.

Cache 324 is shown as a cache independent of any specific thread, while being utilized by multiple threads 320, 322. Cache 324 can interact directly with memory manager 222, as shown in FIG. 3A. In some embodiments, cache 324 can be a global-cache-managed cache, such as global-cache-managed-cache 310b, 312b, 314b. In some embodiments where cache 324 is a global-cache-managed cache, cache 324 can include functionality to perform the part or all of the herein-described functionality of a global cache manager and/or communicate with the global cache manager, such as global cache manager 214. In still other embodiments, application 212 can be implemented to not use threads; e.g., on a computing device that does not support threading or an application that does not require threading to carry out its tasks. In these embodiments, cache 324 can be utilized by the non-threading application, perhaps as a global-cache-managed cache.

Figure 3B:
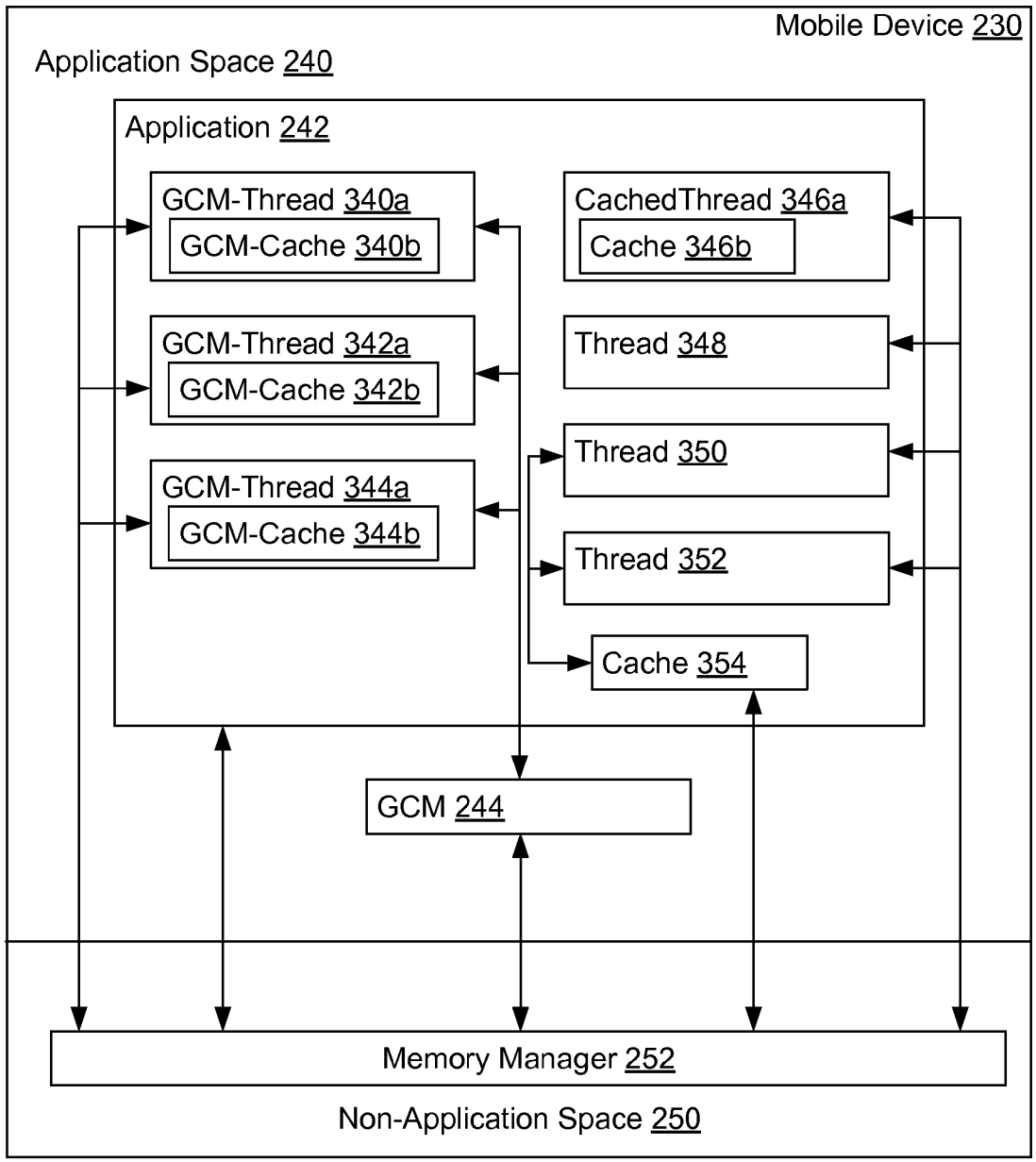
FIG. 3B is a block diagram of an example application utilizing the memory architecture depicted in FIG. 2B, in accordance with an example embodiment.

FIG. 3B is a block diagram of an application 242 utilizing the memory architecture depicted in FIG. 2B for mobile device 230, in accordance with an example embodiment. FIG. 3B shows application 212 resident in application space 210. As with application 210 discussed above in the context of FIG. 3A, application 242 has seven threads 340a, 342a, 344a, 346a, 348, 350, and 352. Of these seven threads for application 242, four have caches: cached threads 340a, 342a, 344a, and 346a. Three cached threads 340a, 342a, and 344a have respective caches 340b, 342b, 344b that are managed by global cache manager 244 and one thread 346a with cache 346b that is not managed by global cache manager 244. In some embodiments, more or fewer threads can be allocated to application 242. In other embodiments, more, fewer, or all threads allocated to application 242 can be cached threads. In still other embodiments, fewer cached threads or all cached threads of application 242 can have their respective caches managed by global cache manager 244.

FIG. 3B shows that each thread 340a, 342a, 344a, 346a, 348, 350, 352, application 242, and global cache manager 244 are each configured to communicate with memory manager 252, which is resident in non-application space 250. Each of threads 340a, 342a, 344a, 346a, 348, 350, 352, application 242, and global cache manager 244 can communicate with memory manager 252 to allocate memory, deallocate memory, utilize (e.g., read and write) memory, inquire about memory limitations, such as memory utilization values and/or memory limits, on the thread, global cache manager 244, or application 242, and as needed for other activities, such as utilization of input and output resources of mobile device 230.

Global cache manager 244 is shown in FIG. 3B as an application that is distinct from application 242. For example, global cache manager 244 can be implemented as a daemon process or thread residing and executing in application space 240. Other implementations of global cache manager 244 residing and executing in application space 240 are possible as well.

Cache 354 is shown as a cache independent of any specific thread, while being utilized by multiple threads 350, 352. Cache 354 can interact directly with memory manager 252, as shown in FIG. 3B. In some embodiments, cache 354 can be a global-cache-managed cache, such as global-cache-managed-cache 340b, 342b, 344b. In some embodiments where cache 324 is a global-cache-managed cache, cache 324 can include functionality to perform the part or all of the herein-described functionality of a global cache manager and/or communicate with the global cache manager, such as global cache manager 244. In still other embodiments, application 242 can be implemented to not use threads; e.g., on a computing device that does not support threading or an application that does not require threading to carry out its tasks. In these embodiments, cache 354 can be utilized by the non-threading application, perhaps as a global-cache-managed cache.

Figure 3C:
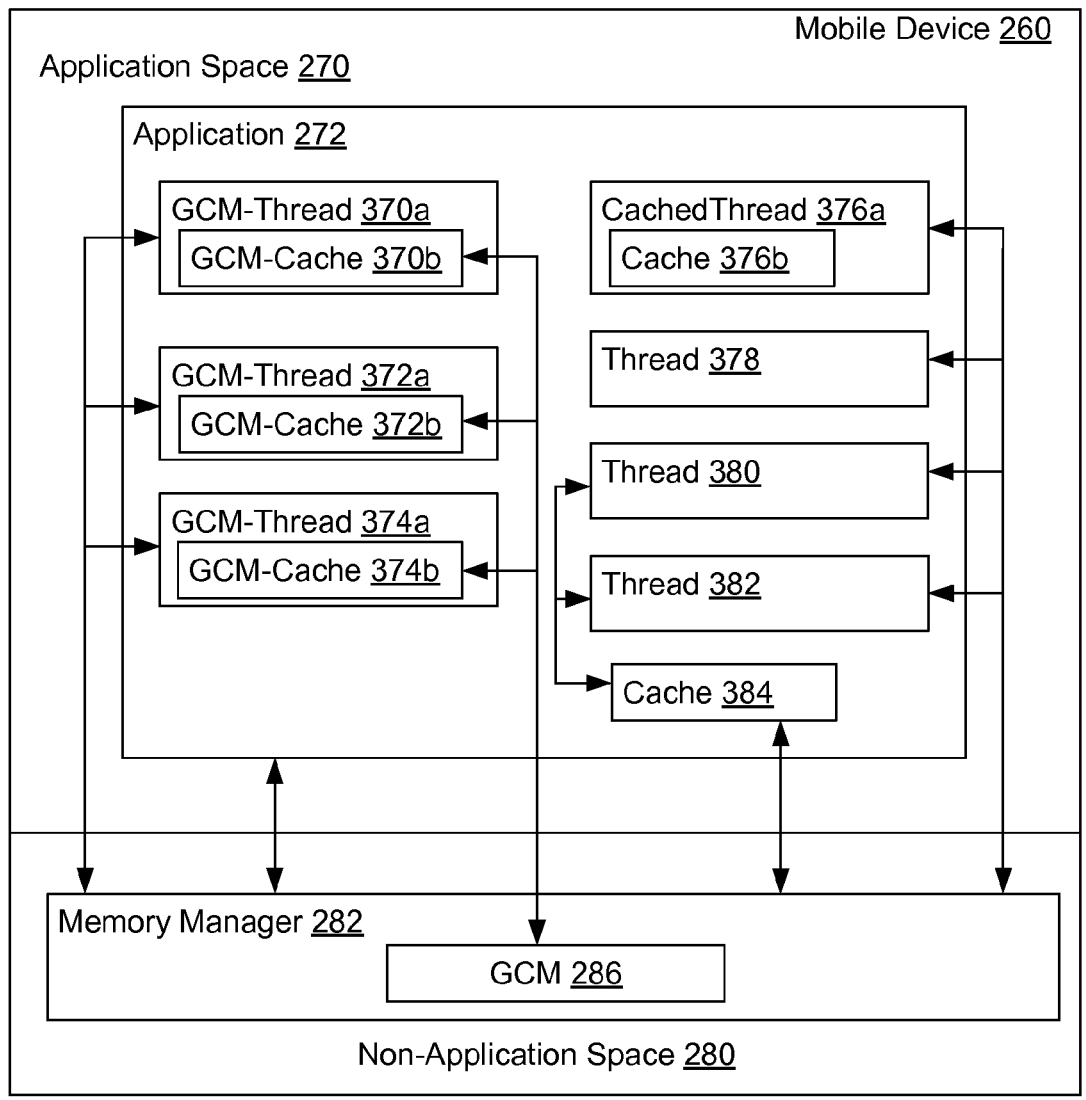
FIG. 3C is a block diagram of an example application utilizing the memory architecture depicted in FIG. 2C, in accordance with an example embodiment.

FIG. 3C is a block diagram of an application 272 utilizing the memory architecture depicted in FIG. 2C for mobile device 260, in accordance with an example embodiment. FIG. 3B shows application 272 resident in application space 270. As with applications 210 and 240 discussed above in the respective contexts of FIGS. 3A and 3B, application 272 has seven threads 370a, 372a, 374a, 376a, 378, 380, and 382. Of these seven threads for application 272, four have caches: cached threads 370a, 372a, 374a, and 376a. Three cached threads 370a, 372a, and 374a have respective caches 370b, 372b, 374b that are managed by global cache manager 286 and one thread 376a with cache 376b that is not managed by global cache manager 286. In some embodiments, more or fewer threads can be allocated to application 272. In other embodiments, more, fewer, or all threads allocated to application 272 can be cached threads. In still other embodiments, fewer cached threads or all cached threads of application 272 can have their respective caches managed by global cache manager 286.

FIG. 3C shows that each thread 370a, 372a, 374a, 376a, 378, 380, 382, application 272, and global cache manager 286 are each configured to communicate with memory manager 282. FIG. 3C shows that both memory manager 282 and global cache manager 286 are resident in non-application space 280. Each of threads 370a, 372a, 374a, 376a, 378, 380, 382, application 272, and global cache manager 286 can communicate with memory manager 282 to allocate memory, deallocate memory, utilize (e.g., read and write) memory, inquire about memory limitations, such as memory utilization values and/or memory limits, on the thread, global cache manager 286 or application 272, and as needed for other activities, such as utilization of input and output resources of mobile device 260.

Global cache manager 286 is shown in FIG. 3C as a component of memory manager 282. In other embodiments not shown in FIG. 3C, global cache manager 286 can reside and execute in non-application space 280 separately from memory manager 282. For example, global cache manager 286 can be implemented as a daemon process or thread residing and executing in non-application space 280 that is separate from process(es) and thread(s) used to implement memory manager 282. Other implementations of global cache manager 286 residing and executing in non-application space 280 are possible as well.

Cache 384 is shown as a cache independent of any specific thread, while being utilized by multiple threads 380, 382. Cache 384 can interact directly with memory manager 282, as shown in FIG. 3B. In some embodiments, cache 384 can be a global-cache-managed cache, such as global-cache-managed-cache 370b, 372b, 374b. In some embodiments where cache 384 is a global-cache-managed cache, cache 384 can include functionality to perform the part or all of the herein-described functionality of a global cache manager and/or communicate with the global cache manager, such as global cache manager 286. In still other embodiments, application 272 can be implemented to not use threads; e.g., on a computing device that does not support threading or an application that does not require threading to carry out its tasks. In these embodiments, cache 384 can be utilized by the non-threading application, perhaps as a global-cache-managed cache.

Figure 4A:
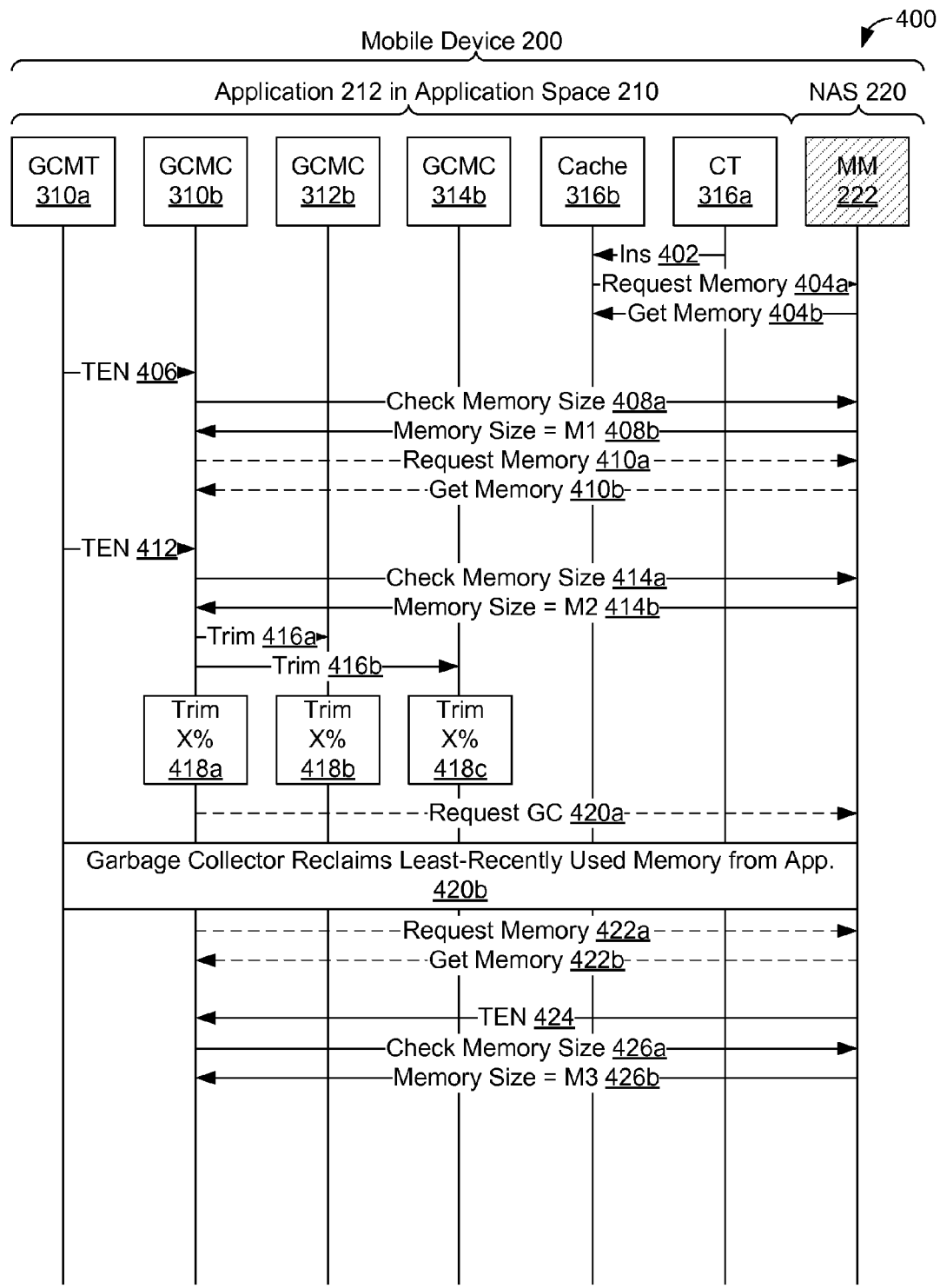
FIG. 4A depicts a messaging scenario for the example application depicted in FIG. 3A, in accordance with an example embodiment.

FIG. 4A depicts messaging scenario 400, which involves application 212 as depicted in FIG. 3A, in accordance with an example embodiment. Scenario 400 shows memory operations for both global-cache-managed threads and non-global-cache-managed caches as well as example operations for non-global-cache-managed threads and caches with a global cache manager that is part of application(s) utilizing global-cache managed threads. FIG. 4A shows mobile device 200 with application space 210 and non-application space 220. Resident in application space 210 are global-cache-managed thread (GCMT) 310a, global-cache-managed caches (GC-MCs) 310b, 312b, 314b, cached thread (CT) 316a, and cache 316b, while memory manager (MM) 222 is resident in non-application space (NAS) 220.

In scenario 400, application 212 has a memory limit. The memory limit is a maximum amount of memory that application 212 can utilize without penalty. If application 212 utilizes more memory than the memory limit, then memory manager 222 or some other component of mobile device 200 (e.g., an operating system component or virtual machine component) can penalize application 212 by terminating part or all of application 212, deallocating some or all of the memory allocated to application 212, putting application 212 to sleep for a period of time, putting application 212 to sleep until an amount of memory is free, or combinations thereof. Other penalties to application 212 for exceeding its memory limit are possible as well. In some embodiments, the memory limit can be pre-determined and/or fixed throughout execution of application 212. In other embodiments, the memory limit can be dynamic; e.g., as applications and/or memory usage changes, the memory limit for application 212 can change as well—for a specific example, suppose N applications other than application 212 are executing on mobile device 200 with N≥0, then application 212 can have a memory limit that is based on N; e.g., application 212 is allocated at least 100%/(N+1) of available memory.

Scenario 400 begins with cached thread 316a sending insertion message 402 to cache 316b. Insertion message 402 can be a message requesting storage for a requested number of bytes, a requested number of items (e.g., objects, records, data structures, inputs, outputs), or for some other entities; e.g., cache keys, rows, and/or columns. Cache 316b can then send request memory message 404a to memory manager 222 to request allocation of an amount of memory to store the data requested to be stored by cached thread 316a. In scenario 400, memory manager 222 has sufficient memory to provide at least the amount of memory requested by thread 316a, and so sends a successful get memory message 404b to cache 316b. In response, cache 316b can utilize the memory provided by memory manager 222 as indicated in get memory message 404b.

In some scenarios, request memory message 404a can request more memory than requested via insertion message 402; e.g., if insertion message 402 requests 107 bytes of memory and memory manager can only provide cache with memory in 16-byte units, then cache 316b may request 16×7=112 bytes of memory to store the requested 107 bytes. In other scenarios, request memory message 404a can request less memory than requested via insertion message 402; e.g., for the previously-mentioned 107 byte request, cache 316b can have some memory already available to store part of the requested 107 bytes. For example, if cache 316b has 100 bytes of free memory already, then request memory message 404a can request 7 bytes via request memory message 404a of memory in response to the 107 byte request. In still other scenarios, cached thread 316a can send and receive the messages shown as sent and received by cache 316b.

In still other scenarios, insertion message 402 may not require that memory be added to cache 316. For example, cache 316 can have enough memory already allocated to handle insertion message 402 or memory can be added to cache 316 via other techniques, such as automatic memory allocation techniques performed by a run-time system. In these scenarios, request memory message 404a and/or get memory message 404b may not be sent.

Scenario 400 continues with global-cache-managed thread 310a sending triggering-event notification (TEN) 406 to global-cache-managed cache 310b. For example, triggering-event notification 406 can be an insertion message sent by global-cache-managed thread 310a. In other examples, triggering-event notification 406 can notify global-cache-managed cache 310b about expiration of a timer provided by global-cache-managed thread 310. In even other examples, triggering-event notification 406 can be received by global-cache-managed cache 310b from a source other than indicating that global-cache-managed thread 310a; e.g., information about memory utilization received from memory manager 222 or an operating system of mobile device 210. Other triggering events and triggering event notifications are possible as well.

In scenario 400, global-cache-managed cache 310b is configured to determine whether memory utilized by application 212 is within a threshold amount of the memory limit. In this example, the threshold amount is 95% of the memory limit. Other threshold amount(s), including use of multiple threshold amounts, can be utilized by global-cache-managed cache 310b as discussed above. If global-cache-managed cache 310b determines the memory utilized by application 212 is within the threshold amount; i.e., application 212 is using more memory than 95% of its memory limit, then global-cache-managed cache 310b can determine that application 212 is approaching the memory limit and take action.

In response to triggering-event notification 406, global-cache-managed cache 310b can send check memory size message 408a to memory manager 222 to request information about a memory size, or memory allocated to application 212. Memory manager 222 can respond to check memory size message 408a with memory size message 408b that indicates that application 212 is utilizing M1 units of memory, where the units can be bits, bytes, integer numbers of bits or bytes (e.g., 1 unit can be a power of two number of bits or bytes such as 128 bits or 1024 bytes, a power of 10 number such as 100 bytes or 1000 bits, or some other integer number of bits or bytes), or some other type of units.

In scenario 400, the amount of memory represented by the M1 value is not within the threshold amount of the memory limit for application 212; e.g., M1 is less than 95% of the memory limit. If triggering-event notification 406 is not an insertion message, scenario 400 can continue with triggering-event notification 412.

If triggering-event notification 406 is an insertion message, global cache manager 214 can explicitly approve adding memory to global-cache-managed cache 310b, or in some embodiments, implicitly approve adding memory by not taking additional action. Then, global-cache-managed cache 310b can send request memory message 410a to memory manager 222 requesting allocation of memory to accommodate triggering-event notification 406. FIG. 4A shows request memory message 410a using dashed lines to indicate the message is optional, as request memory message 410a would not be sent in scenario 400 if triggering event notification is not an insertion message.

In scenario 400, memory manager 222 has sufficient memory to provide at least the amount of memory requested by global-cache-managed cache 310b to accommodate triggering-event notification 406 of an insertion message, and so sends a successful get memory message 410b as an indication that the requested memory has been allocated to global-cache-managed cache 310b. In response, global-cache-managed cache 310b can utilize the memory indicated by get memory message 410b. In some scenarios, request memory message 410a can request more or less memory than requested via triggering-event notification 406 as discussed above regarding request memory message 404a and insertion message 402. In other scenarios, global-cache-managed thread 310a can send and receive the messages shown as sent and received by global-cache-managed cache 310b. FIG. 4A shows get memory message 410b using dashed lines to indicate the message is optional, as get memory message 410b would not be sent in scenario 400 if triggering event notification is not an insertion message.

Scenario 400 continues with global-cache-managed thread 310a sending triggering-event notification 412 to global-cache-managed cache 310b. In response to triggering-event notification 412, global-cache-managed cache 310b can request information about the memory size allocated to application 212, using check memory size message 414a. Memory manager 222 can respond with memory size message 414b that indicates that application 212 is utilizing M2 units of memory, where the units can be as discussed above regarding memory size message 408b.

In scenario 400, the amount of memory represented by the M2 value is within the threshold amount of the memory limit for application 212; e.g., M2 is greater than 95% of the memory limit. As such, global cache manager 214 can request that memory be freed from application 212. To request freeing of memory, global cache manager 214 can send a trim, or reduce memory usage, message to each global-cache-managed cache 310b, 312b, 314b of application 212. FIG. 4A shows that global-cache-managed cache 310b, acting as or on behalf of global cache manager 214, send trim messages 416a, 416b respectively to global-cache-managed caches 312b, 314b to request each cache reduce memory usage. In scenario 400, global-cache-managed cache 310b sends, along with send trim messages 416a, 416b, a trim message to itself—the trim message sent to and from global-cache-managed cache 310b is not shown in FIG. 4A.

A trim message can specify an amount of memory requested for trimming (reduction) in terms of a percentage amount, e.g., reduce storage for a global-cache-managed cache by X % of allocated memory; in terms of a number of units, e.g., reduce storage for the global-cache-managed cache by X1 units of allocated memory; in terms of a range of percentages or units; e.g., a range from X % to Y %, a range from X1 to Y1 units of memory, or using some other specification.

Each global-cache-managed cache 310b, 312b, 314b can cease utilization of at least the amount of memory requested for trimming as specified in a trim message for the global-cache-managed cache. In scenario 400, the trim messages sent to each of global-cache-managed caches 310b, 312b, and 314b requested reduction of X % (e.g., X=5 or 10) of memory allocated to the respective cache. In response, each of global-cache-managed caches 310b, 312b, and 314b can cease utilization of at least X % of memory allocated to the respective cache, as shown in FIG. 4A as "Trim X %" operation 418a for global-cache-managed cache 310b, as "Trim X %" operation 418b for global-cache-managed cache 312b, and as "Trim X %" operation 418c for global-cache-managed cache 314b.

In some scenarios, after or during trim operations 418a, 418b, 418c, global-cache-managed cache 310b, acting as or on behalf of global cache manager 214, can request memory manager 222 perform garbage collection (GC) via request garbage collection message 420a. In response, garbage collector 224 of memory manager 222 can perform reclaim memory operation 420b to reclaim memory from application 212. For example, garbage collector 224 can reclaim: memory not recently used by application 212, memory allocated to inactive and/or terminated threads of application 212, memory requested for deallocation by application 212, and/or memory satisfying other criteria; e.g., memory most recently allocated to application 212. Memory reclaimed from application 212 can be deallocated from application 212 and assigned to memory manager 222 for later allocation to applications, threads, objects, processes, caches and/or other memory-utilizing aspects of mobile device 200, including reallocation of memory to application 212. In some scenarios, garbage collector 224 can reclaim memory from additional applications than application 212 during reclaim memory operation 420b; e.g., garbage collector 224 can reclaim memory from all applications in application space 210 during reclaim memory operation 420b.

After reclaim memory operation 420b, if triggering-event notification 412 is not an insertion message, scenario 400 can continue with triggering-event notification 424.

Otherwise, in scenario 400, sufficient memory is reclaimed from application 212 during reclaim memory operation 420b to accommodate triggering-event notification 412, which is an insertion message. For example, the X % trimmed during trim operations 418a, 418b, 418c can induce to a garbage collector using a least-recently-used (LRU) memory reclamation strategy to reclaim at least X % from each of caches 310b, 312b, and 314b, where the sum total of memory reclaimed from application 212 exceeds an amount of memory requested using triggering-event notification 412.

Note that if sufficient memory is not reclaimed from application 212 during reclaim memory operation 420b, then requesting memory to accommodate triggering-event notification 412 can lead to application 212 exceeding its memory limit and so incurring a penalty as discussed above. In some embodiments, global cache manager 214 can check memory size and limits for application 212 after memory is reclaimed to verify that sufficient memory is reclaimed to accommodate triggering-event notification 412 and/or verify that sufficient memory is reclaimed so that accommodating triggering-event notification 412 will not cause application 212 to exceed the threshold amount of memory utilized; i.e., does not approach the memory limit. If sufficient memory is not reclaimed, global cache manager 214 can attempt to obtain additional memory by sending additional trim and request garbage collection message(s), denying triggering-event notification 412, waiting for some time (e.g., for a pre-determined period of time, for memory to be freed, for the reclaim memory operation to proceed, for the reclaim memory operation to finish), or combinations thereof In other scenarios, triggering-event notification 406 and/or triggering-event notification 412 can be insertion message(s) that do/does not require that memory be added to cache 310b. For example, cache 310b can have enough memory already allocated to handle triggering-event notification 406 and/or triggering-event notification 412 or memory can be added to cache 316 via other techniques, such as dynamic memory allocation. In these scenarios, some or all of request memory messages 410a, 422a and get memory messages 410b, 422b may not be sent.

Scenario 400 continues with global-cache-managed cache 310b sending request memory message 422a to memory manager 222 to request allocation of memory to accommodate triggering-event notification 412. In scenario 400, memory manager 222 has sufficient memory to accommodate triggering-event notification 412 and the amount of memory requested does not exceed the memory limit for application 212 after reclaim memory operation 420b. Thus, memory manager 222 sends a successful get memory message 422b to global-cache-managed cache 310b as an indication that the requested memory has been allocated to global-cache-managed cache 310b. In response, global-cache-managed cache 310b can utilize the memory indicated by get memory message 422b. In some scenarios, request memory message 422a can request more or less memory than requested via triggering-event notification 406 as discussed above regarding request memory message 404a and insertion message 402.

Scenario 400 continues with memory manager 222 sending triggering-event notification 424 to global-cache-managed cache 310b; e.g., a memory-allocation-notification event notification. In scenario 400, memory manager 222 does not send insertion messages, so triggering-event notification 424 is not an insertion message.

In response to triggering-event notification 424, global-cache-managed cache 310b can send check memory size message 426a to request information about the memory size allocated to application 212. Memory manager 222 can respond with memory size message 426b to indicate that application 212 is utilizing M3 units of memory, where the units can be as discussed above regarding memory size message 408b.

In some scenarios, global-cache-managed cache 310b may not send check memory size message 426a and so not receive memory size message 426b. For examples, triggering-event notification 424 could indicate that application 212 is at or very near the memory limit (e.g., application 212 is using 99% of the memory specified by the memory limit) or could indicate application 212 is not near the threshold amount (e.g., application 212 is using 50% of the memory specified by the memory limit and the threshold amount is 95% of the memory limit). In such cases, checking memory immediately or very nearly after receiving triggering-event notification 424 can be considered to be redundant. Then, global-cache-managed cache 310b may not send check memory size message 426a as being redundant.

In scenario 400, the amount of memory represented by the M3 value is not within the threshold amount of the memory limit for application 212; e.g., M3 is less than 95% of the memory limit. Then, global cache-managed cache 340b need not take any further action, and scenario 400 can conclude.

Figure 4B:
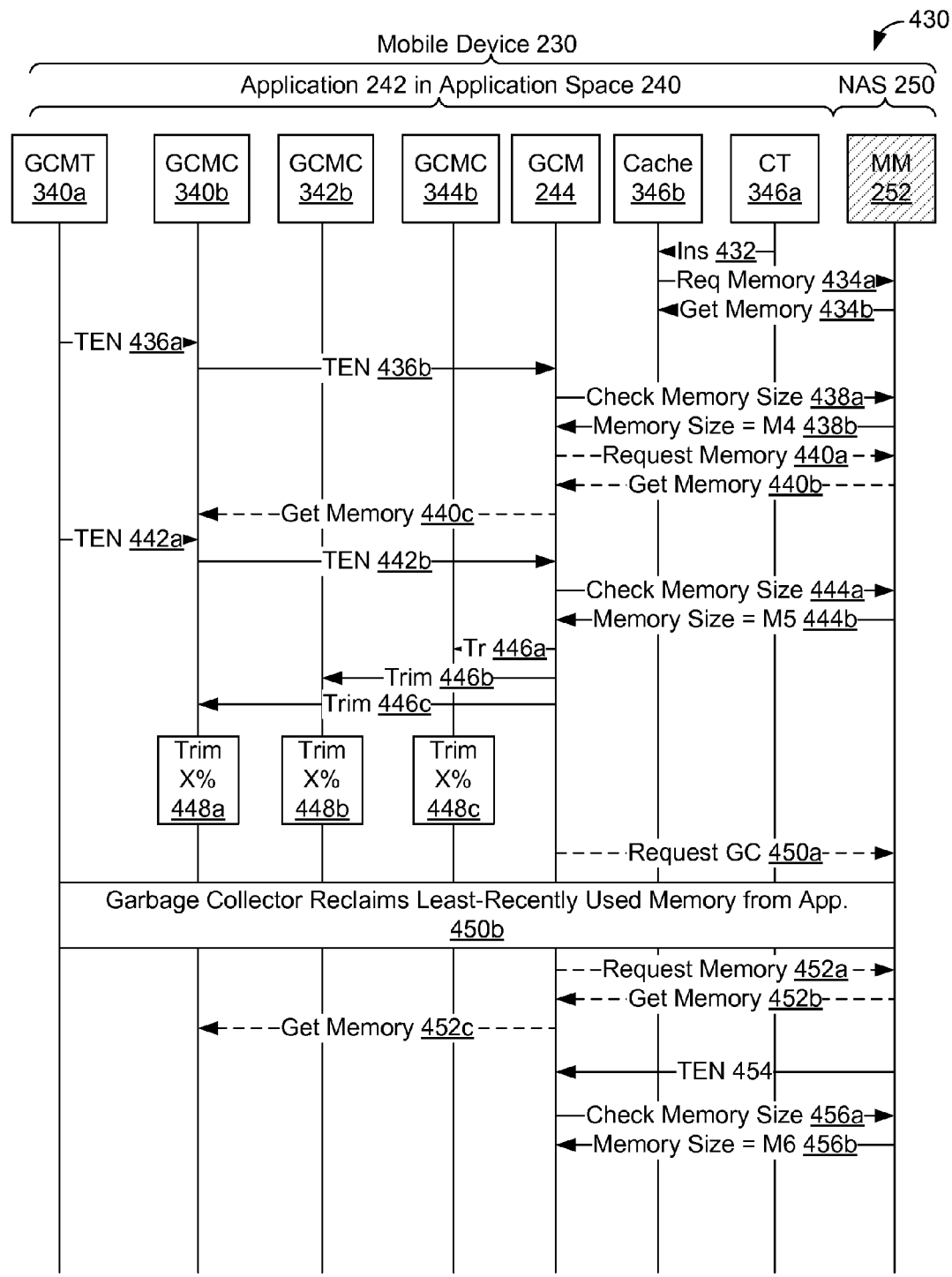
FIG. 4B depicts a messaging scenario for the example application depicted in FIG. 3B, in accordance with an example embodiment.

FIG. 4B depicts messaging scenario 430, which involves application 242 as depicted in FIG. 3B, in accordance with an example embodiment. Scenario 430 shows memory operations for global-cache-managed threads and caches as well as example operations for non-global-cache-managed threads and caches where the global cache manager is a separate thread or process resident in application space. FIG. 4B shows mobile device 230 with application space 240 and non-application space 250. Resident in application space 240 are global-cache-managed thread 340a, global-cache-managed caches 340b, 342b, 344b, global cache manager 244, cached thread 346a, and cache 346b, while memory manager 252 is resident in non-application space 250.

In scenario 430, application 242 has a memory limit, such as discussed above at least in the context of scenario 400 and FIG. 4A. Also, for scenario 430, global cache manager 244 is configured to determine whether memory utilized by application 212 is within a threshold amount of the memory limit. As with scenario 400, the threshold amount is 95%, but other threshold amount(s), including use of multiple threshold amounts, can be utilized by global cache manager 244 as discussed above. Further for scenario 430, memory manager 252 does not send insertion messages, as discussed above for scenario 400.

Scenario 430 begins with cached thread 346a sending insertion message 432 to cache 346b. Insertion message 432 can be a message requesting storage, such as discussed above in the context of at least scenario 400 and FIG. 4A. Cache 346b can then send request memory message 434a to memory manager 252 to request allocation of an amount of memory to store the data requested to be stored by cached thread 346a. In scenario 430, memory manager 252 has sufficient memory to provide at least the amount of memory requested by cache 346b, and so sends a successful get memory message 434b to cache 346b. In response, cache 346b can utilize the memory provided by memory manager 252 as indicated using get memory message 434b. In some scenarios, request memory message 434a can request more or memory than requested via insertion message 432, such as discussed above at least in the context of scenario 400 and FIG. 4A.

In other scenarios, insertion message 432 may not require that memory be added to cache 346b, such as discussed above regarding insertion message 402 of FIG. 4A.

Scenario 430 continues with global-cache-managed thread 340a sending triggering-event notification 436a to global-cache-managed cache 340b. Global-cache-managed cache 340b can forward the triggering-event notification, as triggering-event notification 436b, to global cache manager 244. Possible types of triggering event notifications are discussed above in the context of at least FIG. 4A.

In response to triggering-event notification 436b, global cache manager 244 can then send check memory size message 438a to request information from memory manager 252 about a memory size for application 242. Memory manager 252 can respond with memory size message 438b that indicates that application 242 is utilizing M4 units of memory, where the units of memory are as discussed above in the context of FIG. 4A.

In scenario 430, global cache manager 244 is configured to determine whether memory utilized by application 242 is within the above-mentioned threshold amount of the memory limit. If global cache manager 244 determines the memory utilized by application 242 is within the threshold amount; i.e., application 242 is using more memory than 95% of its memory limit, then global cache manager 244 can determine that application 242 is approaching the memory limit and take action.

In scenario 430, the amount of memory represented by the M4 value is not within the threshold amount of the memory limit for application 242; e.g., M4 is less than 95% of the memory limit. If triggering-event notification 436b is not an insertion message, scenario 430 can continue with triggering-event notification 442a.

If triggering-event notification 436b is an insertion message, global cache manager 244 can explicitly approve adding memory to global-cache-managed cache 340b by sending request memory message 440a to memory manager 252. In some embodiments (e.g., where insertion messages are sent from global-cache-managed thread 340a to both global cache manager 244 and memory manager 252), global cache manager 244 can implicitly approve adding memory by not taking additional action. FIG. 4B shows request memory message 440a using dashed lines to indicate the message is optional as discussed above in the context of request memory message 410a.

In scenario 430, memory manager 252 has sufficient memory to accommodate triggering-event notification 436b. FIG. 4B shows that memory manager 252 sends get memory message 440b to global cache manager 244 as an indication that the requested memory has been allocated to global-cache-managed cache 340b. In response, global cache manager 244 can forward the get memory message, as get memory message 440c, to global-cache-managed cache 340b. Global-cache-managed cache 340b can then utilize the memory indicated by get memory message 440c. In some scenarios, request memory message 440a can request more or less memory than requested via triggering-event notifications 436a, 436b, for reasons discussed above at least in the contexts of scenario 400 and FIG. 4A and insertion message 432 of this scenario 430. FIG. 4B shows get memory messages 440b, 440c using dashed lines to indicate the messages are optional, as discussed above in the context of get memory message 410b.

Scenario 430 continues with global-cache-managed thread 340a sending triggering-event notification 442a to global-cache-managed cache 340b. Global-cache-managed cache 340b can forward the triggering-event notification, as triggering-event notification 442b, to global cache manager 244. Global cache manager 244 can then send check memory size message 448a to request information from memory manager 252 about the memory size for application 242. Memory manager 252 can respond with memory size message 444b that indicates that application 242 is utilizing M5 units of memory.

In scenario 430, the amount of memory represented by the M5 value is within the threshold amount of the memory limit for application 242; e.g., M5 is greater than 95% of the memory limit for application 242. As such, global cache manager 244 can request that memory be freed from application 242. To request freeing of memory, global cache manager 244 can send trim messages 446a, 446b, 446c to respective global-cache-managed caches 340b, 342b, 344b of application 242 as shown in FIG. 4B. The amount of memory requested for trimming in a trim message can be specified as discussed above in the context of at least FIG. 4A and scenario 400.

Each global-cache-managed cache 340b, 342b, 344b can cease utilization of at least the amount of memory requested for trimming as specified in each cache's respective trim message 448a, 448b, 448c. In scenario 430, the trim messages 448a, 448b, 448c respectively sent to each of global-cache-managed caches 340b, 342b, and 344b requested reduction of X % (e.g., X=5 or 10) of memory allocated to the respective cache. In response, each of global-cache-managed caches 340b, 342b, and 344b can cease utilization of at least X % of memory allocated to the respective cache, as shown in FIG. 4B as "Trim X %" operation 448a for global-cache-managed cache 340b, as "Trim X %" operation 448b for global-cache-managed cache 342b, and as "Trim X %" operation 448c for global-cache-managed cache 344b.

In some scenarios, after or during trim operations 448a, 448b, 448c, global cache manager 244 can request memory manager 252 perform garbage collection via request garbage collection message 450a. In response, garbage collector 254 of memory manager 252 can perform reclaim memory operation 450b to reclaim memory from application 242, as discussed above in more detail in the context of at least FIG. 4A and scenario 400.

After reclaim memory operation 450b, if triggering-event notification 442b is not an insertion message, scenario 430 can continue with triggering-event notification 454.

Otherwise, in scenario 430, sufficient memory is reclaimed from application 242 during reclaim memory operation 450b to accommodate triggering-event notification 442b, which is an insertion message. Note that if sufficient memory is not reclaimed from application 242 during reclaim memory operation 450b, then requesting memory to accommodate triggering-event notification 442b can lead to application 242 exceeding its memory limit and so incurring a penalty as discussed above. In some embodiments, global cache manager 244 can check memory size and limits for application 242 after memory is reclaimed to verify that sufficient memory is reclaimed to accommodate triggering-event notification 442b and/or verify that sufficient memory is reclaimed so that accommodating triggering-event notification 442b will not cause application 242 to exceed the threshold amount of memory utilized; i.e., does not approach the memory limit. If sufficient memory is not reclaimed, global cache manager 244 can attempt to obtain additional memory by sending additional trim and request garbage collection message(s), denying triggering-event notification 442b, waiting for some time (e.g., for a pre-determined period of time, for memory to be freed, for the reclaim memory operation to proceed, for the reclaim memory operation to finish), or combinations thereof In other scenarios, triggering-event notifications 436a, 436b and/or triggering-event notifications 442a, 442b can be insertion message(s) that do/does not require that memory be added to cache 340b, as discussed above regarding triggering-event notifications 406, 412 of FIG. 4A.

Scenario 430 continues with global cache manager 244 sending request memory message 452a to memory manager 252 to request to request allocation of memory to accommodate triggering-event notification 442b. In scenario 430, memory manager 252 has sufficient memory to accommodate triggering-event notification 442b and the amount of memory requested does not exceed the memory limit for application 242 after reclaim memory operation 450b. FIG. 4B shows that memory manager 252 sends get memory message 452b to global cache manager 244 as an indication that the requested memory has been allocated to global-cache-managed cache 340b. In response, global cache manager 244 can forward the get memory message, as get memory message 452c, to global-cache-managed cache 340b. Global-cache-managed cache 340b can then utilize the memory indicated by get memory message 452c. In some scenarios, request memory message 452a can request more or less memory than requested via triggering-event notifications 442a, 442b for reasons discussed above at least in the contexts of scenario 400 and FIG. 4A and insertion message 432 of this scenario 430.

Scenario 430 continues with memory manager 252 sending triggering-event notification 454 to global cache manager 244. In scenario 430, memory manager 252 does not send insertion messages, so triggering-event notification 454 is not an insertion message.

In response to triggering-event notification 454, global cache manager 244 can send check memory size message 456a to request information from memory manager 252 about the memory size for application 242. Memory manager 252 can respond with memory size message 456b that indicates that application 242 is utilizing M6 units of memory.

In scenario 430, the amount of memory represented by the M6 value is not within the threshold amount of the memory limit for application 242; e.g., M6 is less than 95% of the memory limit. Then, global cache manager 244 need not take any further action, and scenario 430 can conclude.

Figure 4C:
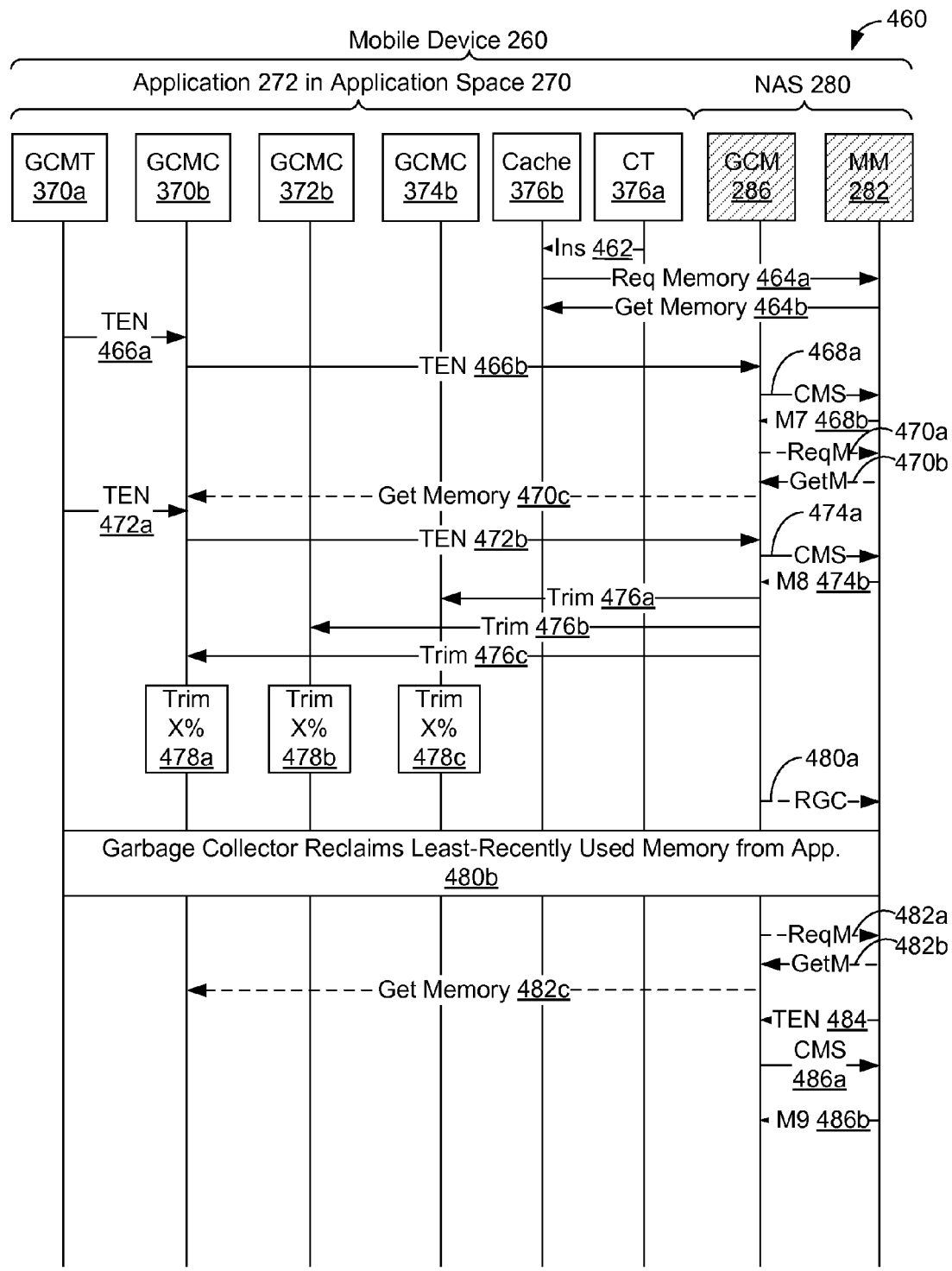
FIG. 4C depicts a messaging scenario for the example application depicted in FIG. 3C, in accordance with an example embodiment.

FIG. 4C depicts messaging scenario 460, which involves application 272 depicted in FIG. 3C, in accordance with an example embodiment. Scenario 460 shows memory operations for both global-cache-managed threads and global-cache-managed caches as well as example operations for non-global-cache-managed threads and non-global-cache-managed caches where the global cache manager is resident in non-application space. FIG. 4C shows mobile device 260 with application space 270 and non-application space 280. Resident in application space 270 are global-cache-managed thread 370a, global-cache-managed caches 370b, 372b, 374b, cached thread 376a, and cache 376b, while memory manager 282 and global cache manager 286 are resident in non-application space 280.

In scenario 460, application 272 has a memory limit, such as discussed above at least in the context of scenarios 400 and 430 and FIGS. 4A and 4B. Also, for scenario 460, global cache manager 286 is configured to determine whether memory utilized by application 212 is within a threshold amount of the memory limit. In scenario 460, the threshold amount is 90%, but other threshold amount(s), including use of multiple threshold amounts, can be utilized by global cache manager 286 as discussed above. Further for scenario 460, memory manager 282 does not send insertion messages, as discussed above for scenarios 400 and 430.

Scenario 460 begins with cached thread 376a sending insertion message 462 to cache 376b. Insertion message 462 can be a message requesting storage, such as discussed above in the context of at least scenario 400 and FIG. 4A. Cache 376b can then send request memory message 464a to memory manager 282 to request allocation of an amount of memory to store the data requested to be stored by cached thread 376a. In scenario 460, memory manager 282 has sufficient memory to provide at least the amount of memory requested by cache 376b, and so sends a successful get memory message 464b to cache 376b. In response, cache 376b can utilize the memory provided by memory manager 282 as indicated using get memory message 464b. In some scenarios, request memory message 464a can request more or memory than requested via insertion message 462, such as discussed above at least in the context of scenario 400 and FIG. 4A.

In other scenarios, insertion message 462 may not require that memory be added to cache 376b, such as discussed above regarding insertion message 402 of FIG. 4A.

Scenario 460 continues with global-cache-managed thread 370a sending triggering-event notification 466a to global-cache-managed cache 370b. Global-cache-managed cache 370b can forward the triggering-event notification, as triggering-event notification 466b, to global cache manager 286. Possible types of triggering event notifications are discussed above in the context of at least FIG. 4A.

In scenario 460, global cache manager 286 is configured to determine whether memory utilized by application 272 is within the above-mentioned threshold amount of the memory limit. If global cache manager 286 determines the memory utilized by application 272 is within the threshold amount; i.e., application 272 is using more memory than 90% of its memory limit, then global cache manager 286 can determine that application 286 is approaching the memory limit and take action.

In response to triggering-event notification 466b, global cache manager 286 can then send check memory size message 468a to request information from memory manager 282 about a memory size for application 272. Memory manager 282 can respond with memory size message 468b that indicates that application 272 is utilizing M7 units of memory, where the units of memory are as discussed above in the context of FIG. 4A.

In scenario 460, the amount of memory represented by the M7 value is not within the threshold amount of the memory limit for application 272; e.g., M7 is less than 90% of the memory limit. If triggering-event notification 466b is not an insertion message, scenario 460 can continue with triggering-event notification 472a.

If triggering-event notification 466b is an insertion message, global cache manager 286 can explicitly approve adding memory to global-cache-managed cache 370b by sending request memory message 470a to memory manager 282. In some embodiments (e.g., where insertion messages are sent from global-cache-managed thread 370a to both global cache manager 286 and memory manager 282), global cache manager 286 can implicitly approve adding memory by not taking additional action. FIG. 4B shows request memory message 470a using dashed lines to indicate the message is optional as discussed above in the context of request memory message 410a.

In scenario 460, memory manager 282 has sufficient memory to accommodate triggering-event notification 466b, and so sends a successful get memory message 470b to global cache manager 286 as an indication that the requested memory has been allocated to global-cache-managed cache 370b. In response, global cache manager 286 can forward the get memory message, as get memory message 470c, to global-cache-managed cache 370b. Global-cache-managed cache 370b can then utilize the memory indicated by get memory message 470c. In some scenarios, request memory message 470a can request more or less memory than requested via triggering-event notification 466b, for reasons discussed above at least in the contexts of scenario 400 and FIG. 4A and insertion message 462 of this scenario 460. FIG. 4C shows get memory messages 470b, 470c using dashed lines to indicate the messages are optional, as discussed above in the context of get memory message 410b.

Scenario 460 continues with global-cache-managed thread 370a sending triggering-event notification 472a to global-cache-managed cache 370b. Global-cache-managed cache 370b can forward the triggering-event notification, as triggering-event notification 472b, to global cache manager 286. Global cache manager 286 can then send check memory size message 478a to request information from memory manager 282 about the memory size for application 272. Memory manager 282 can respond with memory size message 474b that indicates that application 272 is utilizing M8 units of memory.

In scenario 460, the amount of memory represented by the M8 value is within the threshold amount of the memory limit for application 272; e.g., M8 is greater than 90% of the memory limit. As such, global cache manager 286 can request that memory be freed from application 272. To request freeing of memory, global cache manager 286 can send trim messages 476a, 476b, 476c to respective global-cache-managed caches 370b, 372b, 374b of application 272 as shown in FIG. 4C. The amount of memory requested for trimming in a trim message can be specified as discussed above in the context of at least FIG. 4A and scenario 400.

Each global-cache-managed cache 370b, 372b, 374b can cease utilization of at least the amount of memory requested for trimming as specified in each cache's respective trim message 478a, 478b, 478c. In scenario 460, the trim messages 478a, 478b, 478c respectively sent to each of global-cache-managed caches 370b, 372b, and 374b requested reduction of X % (e.g., X=5 or 10) of memory allocated to the respective cache. In response, each of global-cache-managed caches 370b, 372b, and 374b can cease utilization of at least X % of memory allocated to the respective cache, as shown in FIG. 4C as "Trim X %" operation 478a for global-cache-managed cache 370b, as "Trim X %" operation 478b for global-cache-managed cache 372b, and as "Trim X %" operation 478c for global-cache-managed cache 374b.

In some scenarios, after or during trim operations 478a, 478b, 478c, global cache manager 286 can request memory manager 282 perform garbage collection via request garbage collection message 480a. In response, garbage collector 284 of memory manager 282 can perform reclaim memory operation 480b to reclaim memory from application 272, as discussed above in more detail in the context of at least FIG. 4A and scenario 400.

After reclaim memory operation 480b, if triggering-event notification 472b is not an insertion message, scenario 460 can continue with triggering-event notification 484.

Otherwise, in scenario 460, sufficient memory is reclaimed from application 272 during reclaim memory operation 480b to accommodate triggering-event notification 472b, which is an insertion message. Note that if sufficient memory is not reclaimed from application 272 during reclaim memory operation 480b, then requesting memory to accommodate triggering-event notification 472b can lead to application 272 exceeding its memory limit and so incurring a penalty as discussed above. In some embodiments, global cache manager 286 can check memory size and limits for application 272 after memory is reclaimed to verify that sufficient memory is reclaimed to accommodate triggering-event notification 472b; if sufficient memory is not reclaimed, global cache manager 286 can attempt to obtain additional memory by sending additional trim and request garbage collection message(s), denying triggering-event notification 472b, waiting for some time (e.g., for a pre-determined period of time, for memory to be freed, for the reclaim memory operation to proceed, for the reclaim memory operation to finish), or combinations thereof Scenario 460 continues with global cache manager 286 sending request memory message 482a to memory manager 282 to request allocation of memory to accommodate triggering-event notification 472b. In scenario 460, memory manager 282 has sufficient memory to accommodate triggering-event notification 472b and the amount of memory requested does not exceed the memory limit for application 272 after reclaim memory operation 480b. FIG. 4C shows that memory manager 282 sends get memory message 482b to global cache manager 286 as an indication that the requested memory has been allocated to global-cache-managed cache 370b. In response, global cache manager 286 can forward the get memory message, as get memory message 482c, to global-cache-managed cache 370b. Global-cache-managed cache 370b can then utilize the memory indicated by get memory message 482c. In some scenarios, request memory message 482a can request more or less memory than requested via triggering-event notification 472b for reasons discussed above at least in the contexts of scenario 400 and FIG. 4A and insertion message 462 of this scenario 460.

In other scenarios, triggering-event notifications 466a, 466b and/or triggering-event notifications 472a, 472b can be insertion message(s) that do/does not require that memory be added to cache 370b, as discussed above regarding triggering-event notifications 406, 412 of FIG. 4A.

Scenario 460 continues with memory manager 282 sending triggering-event notification 484 to global cache manager 286. In scenario 460, memory manager 282 does not send insertion messages, so triggering-event notification 484 is not an insertion message. In response to triggering-event notification 484, global cache manager 286 can send check memory size message 486a to request information from memory manager 282 about the memory size for application 272. Memory manager 282 can respond with memory size message 486b that indicates that application 272 is utilizing M9 units of memory.

In scenario 460, the amount of memory represented by the M9 value plus the amount of memory requested via insertion messages 484a, 484b does not exceed the memory limit for application 272. In scenario 460, the amount of memory represented by the M9 value is not within the threshold amount of the memory limit for application 272; e.g., M9 is less than 90% of the memory limit. Then, global cache manager 286 need not take any further action, and scenario 460 can conclude.

Figure 5A:
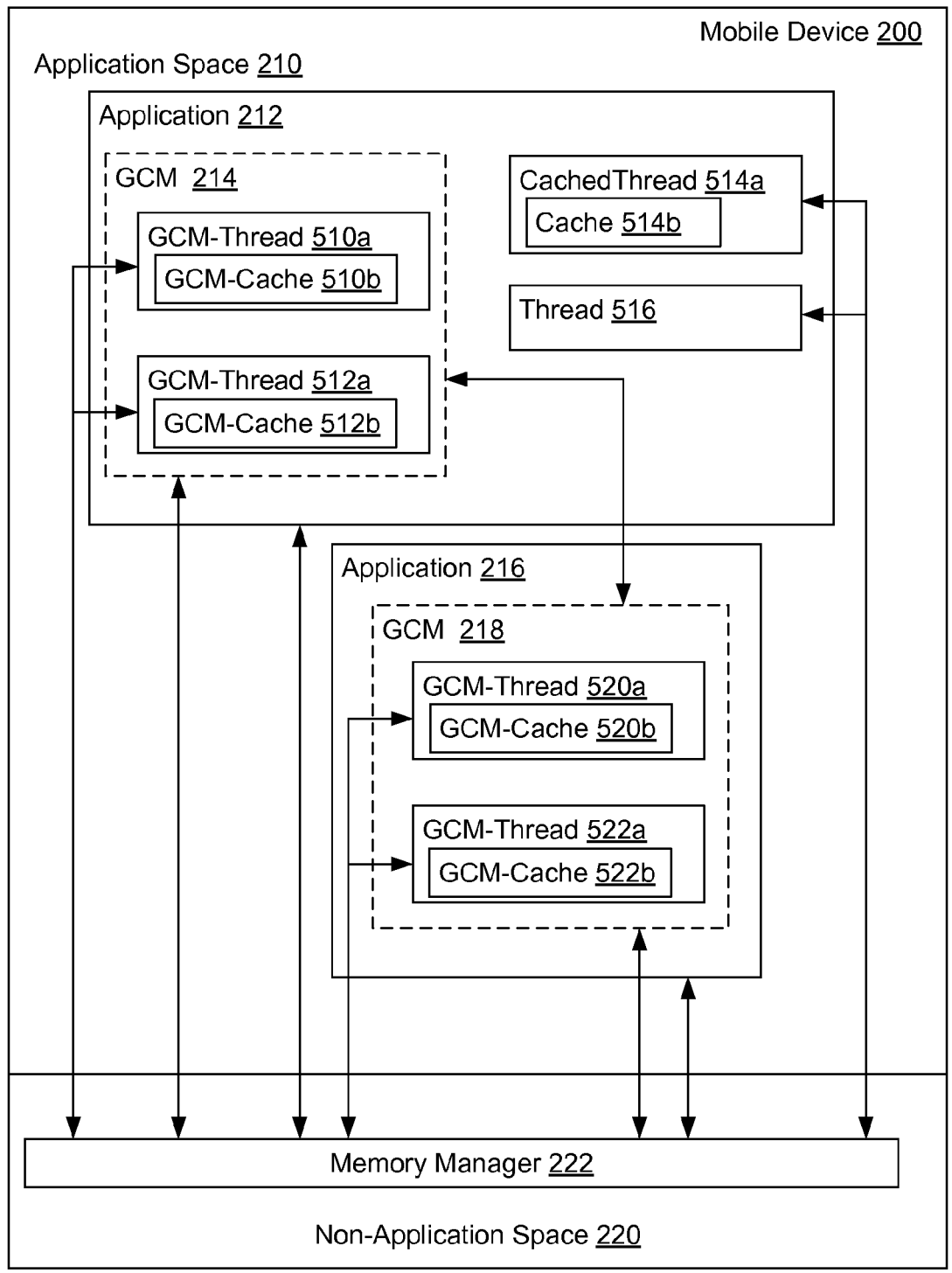
FIG. 5A is a block diagram of two example applications utilizing the memory architecture depicted in FIG. 2A, in accordance with an example embodiment.

FIG. 5A is a block diagram of two example applications utilizing the memory architecture depicted in FIG. 2A, in accordance with an example embodiment. FIG. 5A is similar to FIG. 3A in depicting mobile device 200 with application space 210 and non-application space 220. FIG. 5A, like FIG. 3A, shows application 212 resident in application space 210 and memory manager 222 resident in non-application space 220.

FIG. 5A also depicts application 214 with application 212 in application space 220. FIG. 5A shows application 212 with four threads 510a, 512a, 514a, 516 and application 216 with two threads 520a, 520b. For application 212, threads 510a, 512a, and 514a each have a respective cache 510b, 512b, and 514b, but thread 516 does not have a cache. Cached threads 510a and 512a have respective caches 510b and 512b that are managed by global cache manager 214 and cached thread 514a has cache 514b that is not managed by global cache manager 214. For application 216, both threads 520a, 522a each have a respective cache 520b, 522b and both caches

520b, 522b are managed by global cache manager 218. In some embodiments, more or fewer threads can be allocated to application 212 and/or application 216. In other embodiments, more, fewer, or all threads allocated to application 212 and/or application 216 can be cached threads. In still other embodiments, fewer cached threads or all cached threads of application 212 can have their respective caches managed by global cache manager 214. In even other embodiments, some of the cached threads of application 216 can be configured not to be managed by global cache manager 218.

FIG. 5A shows that each of threads 510a, 512a, 514a, 516, 520a, 522a, applications 212, 216, and global cache managers 214, 218 are configured to communicate with memory manager 222, which is resident in non-application space 220. Each of threads 510a, 512a, 514a, 516, 520a, 522a, applications 212, 216, and global cache managers 214, 218 can communicate with memory manager 222 to allocate memory, deallocate memory, utilize (e.g., read and write) memory, inquire about memory limitations, such as memory utilization values and/or memory limits on a thread, on global cache manager 214 or 218, or application 212 or 216, and as needed for other activities, such as utilization of input and output resources of mobile device 200.

Each of global cache managers 214, 218 is shown in FIG. 5A using a dashed rectangle to indicate that global cache managers 214, 218 each can be implemented as functionality that resides in global-cache-managed threads. For example, global cache manager 214 can be implemented as functionality resident in global-cache-managed threads 510a, 512a, 514a and/or global cache manager 218 can be implemented as functionality resident in global-cache-managed threads 520a, 522a. In other embodiments, global cache manager 218 can be implemented as a separate thread of application 216 from each global-cache-managed-thread 520a, 522a.

FIG. 5A shows that global cache manager 214 can communicate with global cache manager 218. For example, global cache manager 214 can request application 216 trim memory usage via communication with global cache manager 218; as another example, global cache manager 218 can request application 212 trim memory usage via communication with global cache manager 214. Other communication examples between global cache managers are possible as well.

Figure 5B:
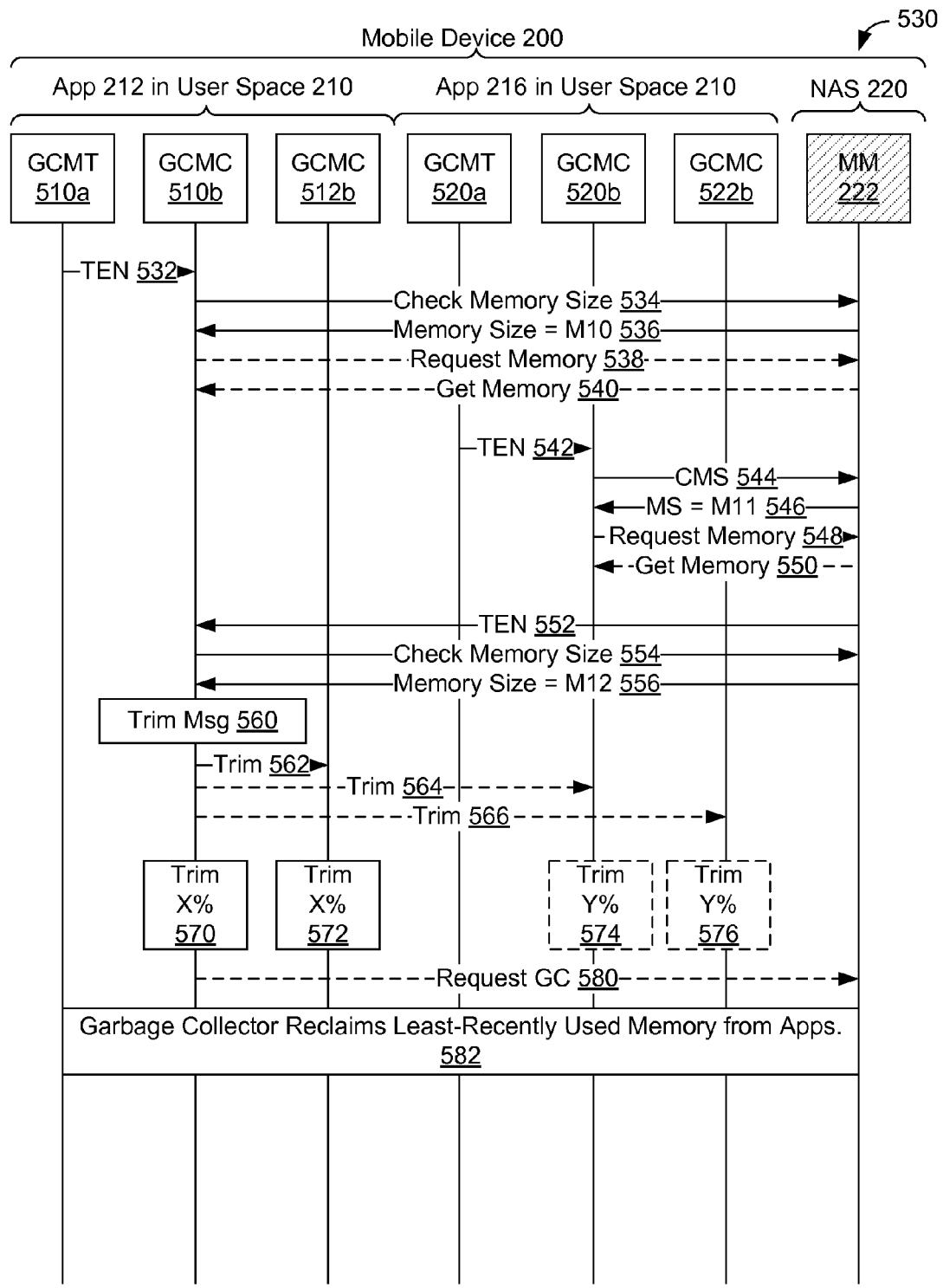
FIG. 5B depicts a messaging scenario for the example applications depicted in FIG. 5A, in accordance with an example embodiment.

FIG. 5B depicts a messaging scenario 530 for the example applications 214, 218 as depicted in FIG. 5A, in accordance with an example embodiment. Scenario 530 shows memory operations for global-cache-managed threads and caches for multiple applications. FIG. 5B shows mobile device 200 with application space 210 and non-application space 220. Resident in application space 210 are global-cache-managed thread 510a and global-cache-managed caches 510b, 512b for application 214, global-cache-managed thread 520a and global-cache-managed caches 520b, 522b for application 214, while memory manager 222 is resident in non-application space 220.

In scenario 530, each application 214, 218 has a respective memory limit, such as discussed above at least in the context of FIGS. 4A-4C. Also, for scenario 530, each of global-cache-managed caches 510b, 510b is configured to determine whether memory utilized by application 212 is within a threshold amount of the memory limit, and each of global-cache-managed caches 520b, 520b is configured to determine whether memory utilized by application 216 is within a threshold amount of the memory limit. The thresholds amounts for applications 212, 216 can be the same or can differ. In scenario 530, the threshold amount for each application 212, 216 is 95%, but other threshold amount(s), including use of multiple threshold amounts, can be utilized as discussed above. Further for scenario 530, memory manager 222 does not send insertion messages, as discussed above for scenarios 400, 430, and 460.

Scenario 530 begins with global-cache-managed thread 510a sending triggering-event notification 532 to global-cache-managed cache 510b. In response to triggering-event notification 532, global-cache-managed cache 510b can send check memory size message 534 to request information from memory manager 222 about a memory size for application 212. Memory manager 222 can respond with memory size message 536 to indicate that application 212 is utilizing M10 units of memory, where the units of memory are as discussed above in the context of FIG. 4A.

In scenario 530, the amount of memory represented by the M10 value is not within the threshold amount of the memory limit for application 212; e.g., M10 is less than 95% of the memory limit. If triggering-event notification 532 is not an insertion message, scenario 530 can continue with triggering-event notification 542.

If triggering-event notification 532 is an insertion message, global cache manager 214 can explicitly approve adding memory to global-cache-managed cache 510b, or in some embodiments, implicitly approve adding memory by not taking additional action. In scenario 530, memory manager 222 has sufficient memory to accommodate triggering-event notification 532. Scenario 530 continues with global-cache-managed cache 520b sending request memory message 538 to memory manager 222. In response, memory manager 222 can send successful get memory message 540 to global-cache-managed cache 510b. Global-cache-managed cache 510b can then utilize the memory provided by memory manager 222. In some scenarios, request memory message 538 can request more or less memory than requested via triggering-event notification 532, for reasons discussed above at least in the contexts of scenario 400 and FIG. 4A. FIG. 5B shows request memory message 538 and get memory message 540 using dashed lines to indicate the messages are optional as discussed above in the contexts of request memory message 410a and get memory message 410b.

Scenario 530 continues with global-cache-managed thread 520a sending triggering-event notification 542 to global-cache-managed cache 520b. In response to triggering-event notification 542, global-cache-managed cache 510b can send check memory size (CMS) message 544 to request information from memory manager 222 about a memory size for application 216. Memory manager 222 can respond with memory size (MS) message 536 to indicate that application 216 is utilizing M11 units of memory, where the units of memory are as discussed above in the context of FIG. 4A.

In scenario 530, the amount of memory represented by the M11 value is not within the threshold amount of the memory limit for application 212; e.g., M11 is less than 95% of the memory limit. If triggering-event notification 542 is not an insertion message, scenario 530 can continue with triggering-event notification 552.

If triggering-event notification 542 is an insertion message, global cache manager 218 can explicitly approve adding memory to global-cache-managed cache 520b, or in some embodiments, implicitly approve adding memory by not taking additional action. In scenario 530, memory manager 222 has sufficient memory to accommodate triggering-event notification 542. Scenario 530 continues with global-cache-managed cache 520b sending request memory message 548 to memory manager 222. In response, memory manager 222 can send successful get memory message 550 to global-cache-managed cache 520b. Global-cache-managed cache 520b can then utilize the memory provided by memory manager 222. In some scenarios, request memory message 548 can request more or less memory than requested via insertion message 542, for reasons discussed above at least in the contexts of scenario 400 and FIG. 4A. FIG. 5B shows request memory message 548 and get memory message 550 using dashed lines to indicate the messages are optional as discussed above in the contexts of request memory message 410a and get memory message 410b.

In other scenarios, triggering-event notification 532 and/or triggering-event notification 542 can be insertion message(s) that do/does not require that memory be added to respective caches 510b, 520b. Insertion messages that do not require memory be added to a cache are discussed above in more detail regarding triggering-event notifications 406, 412 of FIG. 4A.

Scenario 530 continues with memory manager 222 sending triggering-event notification 552 to global-cache-managed cache 510b. In response to triggering-event notification 552, global-cache-managed cache 510b can send check memory size message 554 to request information from memory manager 222 about memory utilized by application 212. Memory manager 222 can respond with memory size message 556 to indicate that application 212 is utilizing M12 units of memory, where the units of memory are as discussed above in the context of FIG. 4A.

In scenario 530, the amount of memory represented by the M12 value is within the threshold amount of the memory limit for application 212; e.g., M12 is greater than 95% of the memory limit for application 212. As such, global cache manager 214 can request that memory be freed from application 212. To request freeing of memory, global cache manager 214 can send trim messages 560, 562 to respective global-cache-managed caches 510b, 512b of application 242 as shown in FIG. 5B. The amount of memory requested for trimming in a trim message can be specified as discussed above in the context of at least FIG. 4A and scenario 400.

In some scenarios, global cache manager 214 can optionally request that memory be freed from application 218 by sending trim messages 564, 566 to respective global-cache-managed caches 520b, 522b of application 216. For example, suppose that triggering-event notification 552 informs global cache manager 214 that mobile device 200 has a very small amount of free memory available for all applications. Then, global cache manager 214 may request global cache manager 218 to trim memory from application 216. Trim messages 564, 566 to respective caches 520b, 520b are shown with dashed lines to indicate that the messages are optional in scenario 530.

Each global-cache-managed cache 510b, 512b, and perhaps caches 520b, 522b, can cease utilization of at least the amount of memory requested for trimming as specified in each cache's respective trim message 570, 572, 574, 576. In scenario 530, the trim messages 560, 562 respectively sent to each of global-cache-managed caches 510b, 512b requested reduction of X % (e.g., X=5 or 10) of memory allocated to the respective cache. Also, the optional trim messages 564, 566 that may be respectively sent to each of global-cache-managed caches 520b, 522b requested reduction of Y % (e.g., Y=5 or 10) of memory allocated to the respective cache.

In response, each of global-cache-managed caches 510b, 512b can cease utilization of at least X % of memory allocated to the respective cache as shown in FIG. 5B as "Trim X %" operation 570 for global-cache-managed cache 510b, as "Trim X %" operation 572 for global-cache-managed cache 512b. In scenarios where trim messages 564, 566 are sent, each of global-cache-managed caches 520b, 512b can cease utilization of at least Y % of memory allocated to the respective cache as shown in FIG. 5B as "Trim Y %" operation 574 for global-cache-managed cache 520b, as "Trim Y %" operation 576 for global-cache-managed cache 522b.

In some scenarios, after or during trim operations 570, 572, and perhaps trim operations 574, 576, global cache manager 214 can request memory manager 222 perform garbage collection via request garbage collection message 580. In response, garbage collector 224 of memory manager 222 can perform reclaim memory operation 582 to reclaim memory from application 212, as discussed above in more detail in the context of at least FIG. 4A and scenario 400. In some scenarios, reclaim memory operation 582 can reclaim memory from other entities in application space 210; e.g., application 216. After completion of reclaim memory operation 582, scenario 530 can conclude.

Example Data Network

Figure 6:
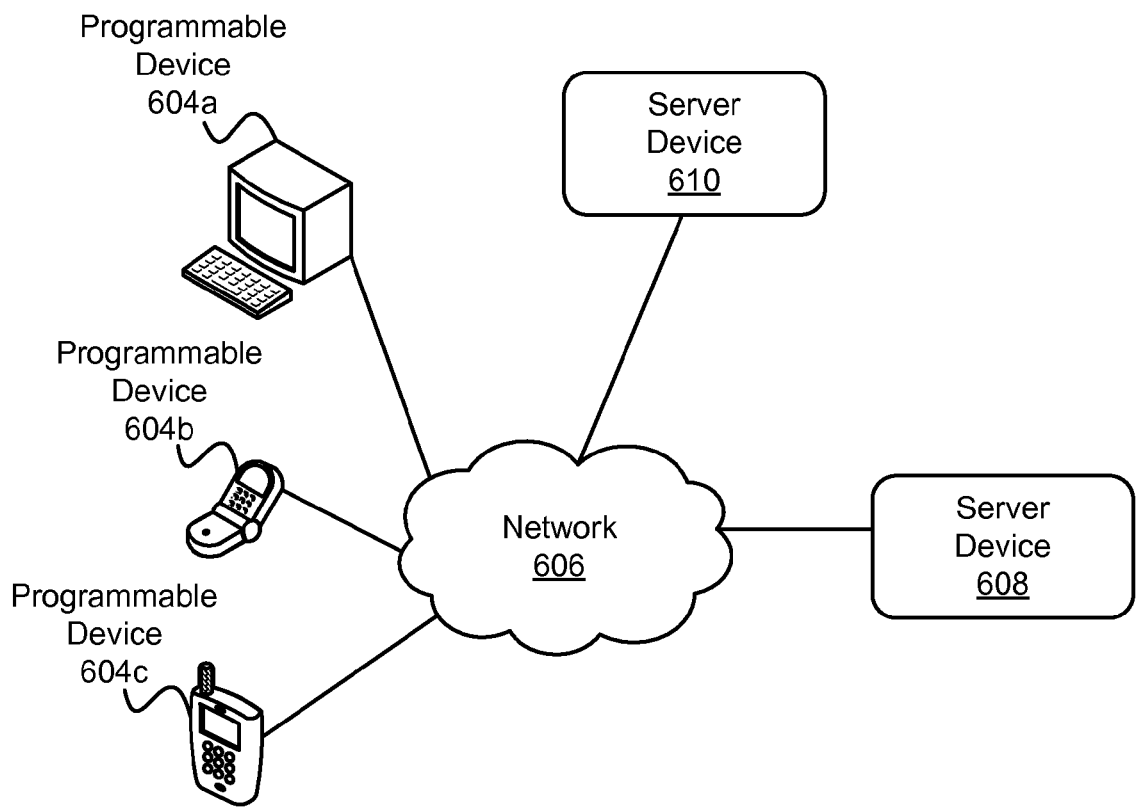
FIG. 6 depicts a distributed computing architecture, in accordance with an example embodiment.

FIG. 6 shows server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smart phone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools. In still other embodiments, programmable devices 604a, 604b, and/or 604c can be configured to perform some or all of the herein-described functionality of a computing device.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 608 and/or 610 can provide programmable devices 604a-604c with access to software for database, search, computation, graphical, audio, video, World Wide Web/Internet utilization, and/or other functions. Many other examples of server devices are possible as well.

Computing Device Architecture

Figure 7A:
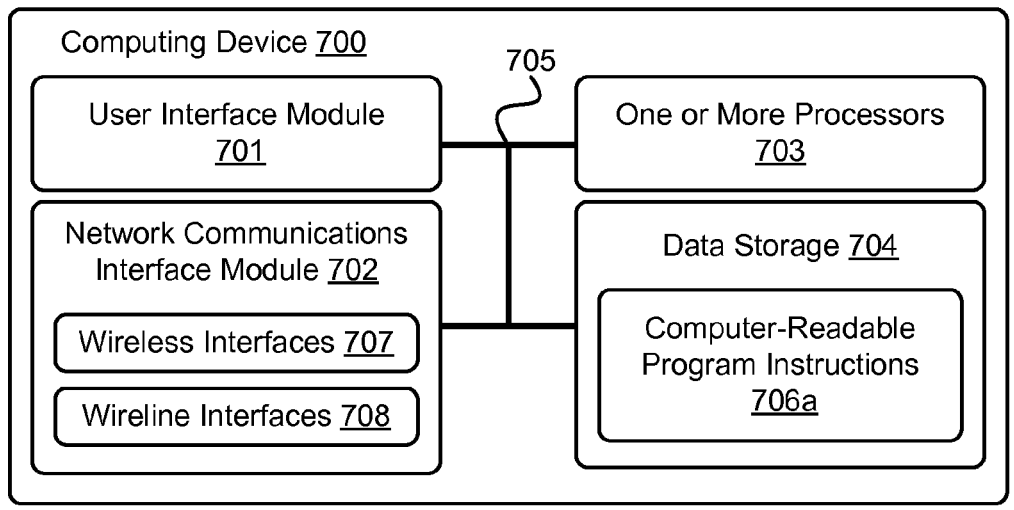
FIG. 7A is a block diagram of a computing device, in accordance with an example embodiment.

FIG. 7A is a block diagram of a computing device (e.g., system) in accordance with an example embodiment. In particular, computing device 600 shown in FIG. 7A can be configured to perform part or all of method 100 and/or some or all of the herein-described functionality of mobile devices 200, 230, 260, applications 212, 216, 242, 246, 272, 274, global cache managers 214, 218, 244, 286, memory managers 222, 252, 282 garbage collectors 224, 254, 284, scenarios 400, 430, 460, 530, herein-disclosed application spaces, non-application space, threads, and caches, one or more functions of server devices 608, 610, network 606, and/or one or more of programmable devices 604a, 604b, and 604c. Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCDs), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706a that are contained in the data storage 704 and/or other instructions as described herein.

Data storage 704 can include one or more computer-readable storage media that can be read and/or accessed by at least one of processors 703. For example, data storage 704 can provide memory for the herein-described application spaces and non-application spaces; i.e., part or all of data storage 704 can be divided into application space(s) and non-application space(s). The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706. Some of computer-readable program instructions 706 can be instructions for operating system 706a. Operating system 706a can be used to schedule applications, threads, and other processes for execution on processor(s) 703, execute applications, threads, and/or other processes using processor(s) 703, allocate part or all of data storage 704, and control devices; e.g., devices used as user interface module 701 and/or network communications interface module 702. In some embodiments, data storage 704 can additionally include storage required to perform at least part of the herein-described methods and techniques and/or at least part of the functionality of the herein-described devices and networks.

Cloud-Based Servers

Figure 7B:
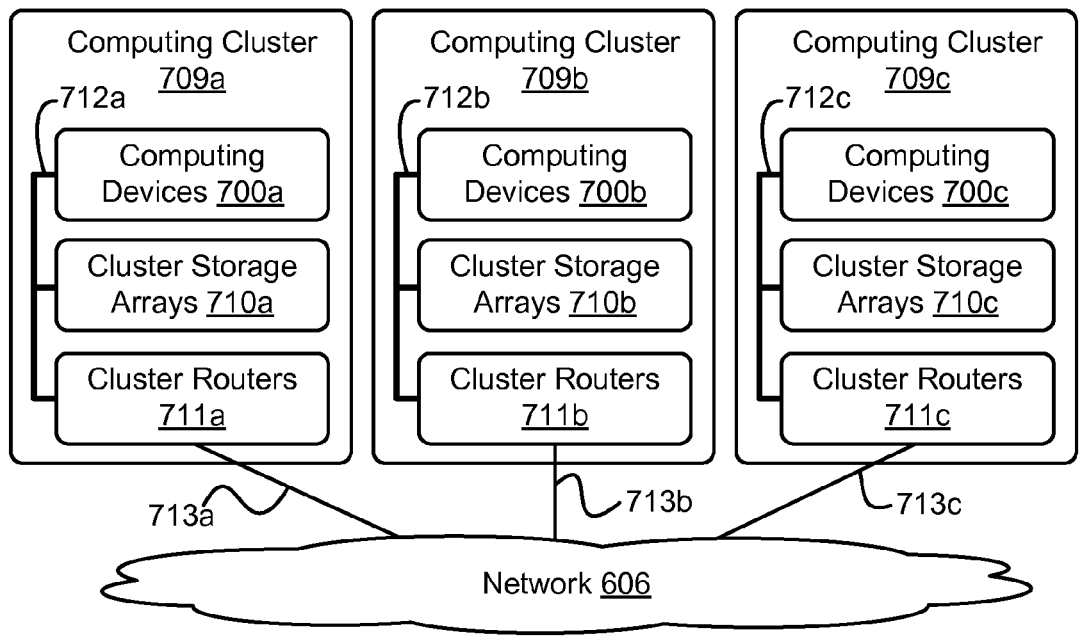
FIG. 7B depicts a cloud-based server system, in accordance with an example embodiment.

FIG. 7B depicts a network 606 of computing clusters 709a, 709b, 709c arranged as a cloud-based server system in accordance with an example embodiment. Server devices 608 and/or 610 can be cloud-based devices that store program logic and/or data of cloud-based applications and/or services. In some embodiments, server devices 608 and/or 610 can be a single computing device residing in a single computing center. In other embodiments, server device 608 and/or 610 can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services at server devices 608 and/or 610 can be encoded as computer readable information stored in non-transitory, tangible computer readable media (or computer readable storage media) and accessible by programmable devices 604a, 604b, and 604c, and/or other computing devices. In some embodiments, data at server device 608 and/or 610 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608 and/or 610 can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of electronic communications server 712. In one embodiment, the various functionalities of electronic communications server 712 can be distributed among one or more of computing devices 700a, 700b, and 700c. Computing devices 700b and 700c in computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server devices 608 and/or 610 can be distributed across computing devices 700a, 700b, and 700c based at least in part on the processing requirements of server devices 608 and/or 610, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 608 and/or 610 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 701a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, and/or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A mobile device, comprising:
   a global cache manager, wherein the global cache manager is configured to manage a cache for one or more applications of the mobile device, wherein the mobile device comprises a non-application space and an application space, wherein the non-application space is distinct from the application space, wherein the non-application space is configured to store an operating system of the mobile device, and wherein the global cache manager and the one or more applications are configured to execute while resident in the application space of the mobile device;
   a processor; and
   a computer-readable storage medium having instructions stored thereon that, upon execution of the instructions by the processor, cause the mobile device to perform functions comprising:
      receiving, at the global cache manager, an indication of a triggering event related to memory allocated for an application of the one or more applications, wherein the global cache manager is distinct from the application;
      responsively determining, using the global cache manager, an amount of memory currently allocated to the application;
      determining, using the global cache manager, whether a memory limit for the application is within a threshold amount of being exceeded by the amount of memory currently allocated to the application; and
      responsive to determining that the memory limit for the application is within the threshold amount of being exceeded, the global cache manager instructing the application to cease utilization of a portion of memory currently allocated to the cache.

2. The mobile device of claim 1, further comprising a memory manager, wherein the memory manager is separate from the global cache manager, wherein the memory manager is configured to be executed while resident in a non-application space of the mobile device, and wherein the non-application space is distinct from the application space.

3. The mobile device of claim 2, wherein the triggering event comprises an insertion event requesting to insert at least a requested amount of memory into the cache, and wherein the functions further comprise:
   responsive to determining that the memory limit for the application is not within the threshold amount of being exceeded, allocating the at least the requested amount of memory to the cache using the memory manager.

4. The mobile device of claim 2, wherein the functions further comprise:
   after instructing the application to cease utilization of the portion of memory currently allocated to the cache, the memory manager:
      determining that the application has ceased utilization of the portion of memory; and
      deallocating the portion of memory.

5. The mobile device of claim 4, wherein the memory manager comprises a garbage collector, and wherein determining that the application has ceased utilization of the portion of memory comprises determining, using the garbage collector, that the application has ceased utilization of the portion of memory; and wherein deallocating the portion of memory comprises deallocating the portion of memory using the garbage collector.

6. The mobile device of claim 1, wherein the application comprises a plurality of threads, wherein each thread of the plurality of threads is configured to perform one or more tasks for the application, wherein the plurality of threads comprises a plurality of caching threads, wherein each caching thread is configured to utilize a cache to perform the one or more tasks for the caching thread, wherein the plurality of caching threads comprises one or more registered caching threads, and wherein each registered caching thread is configured to be registered with the global cache manager.

7. The mobile device of claim 6, wherein the functions further comprise:
   for each registered caching thread, registering the registered caching thread with the global cache manager; and
   wherein instructing the application to cease utilization of the portion of memory currently allocated to the cache comprises instructing each registered caching thread of the one or more registered caching threads to cease utilization of a respective portion of its respective cache.

8. The mobile device of claim 6, wherein the plurality of caching threads comprises one or more non-registered caching threads, and wherein each non-registered caching thread of the one or more non-registered caching threads is not registered with the global cache manager.

9. The mobile device of claim 1, wherein instructing the application to cease utilization of the portion of memory currently allocated to the cache comprises instructing the application to cease utilization of a predetermined percentage of the portion of memory currently allocated to the cache.

10. The mobile device of claim 1, wherein instructing the application to cease utilization of the portion of memory currently allocated to the cache comprises instructing the application to cease utilization of a portion of memory that is least recently used by the cache.

11. The mobile device of claim 1, wherein the triggering event is an event selected from the group consisting of: an insertion event requesting to insert a requested amount of memory into the cache, a memory-allocation-notification event, and a timer expiration event.

12. The mobile device of claim 1, wherein the threshold amount is specified as a predetermined percentage of the memory limit.

13. An article of manufacture including a computer-readable storage medium having instructions stored thereon that, when executed by a processor of the article of manufacture, cause the article of manufacture to perform functions comprising:
- receiving, at a global cache manager, an indication of a triggering event related to memory allocated for an application, wherein the global cache manager is distinct from the application, wherein the article of manufacture comprises a non-application space and an application space, wherein the non-application space is distinct from the application space, and wherein the non-application space is configured to store an operating system of the article of manufacture;
- responsively determining, using the global cache manager associated with the processor, an amount of memory currently allocated to the application, wherein the global cache manager is configured to manage a cache of memory for one or more applications that include, the application, and wherein the global cache manager and the one or more applications are configured to execute while resident in an application space of the mobile device;
- determining, using the global cache manager, whether a memory limit for the application is within a threshold amount of being exceeded by the amount of memory currently allocated to the application; and
- responsive to determining that the memory limit for the application is within the threshold amount of being exceeded, the global cache manager instructing the application to cease utilization of a portion of memory currently allocated to the cache.

14. The article of manufacture of claim 13, wherein the functions further comprise:
- after instructing the application to cease utilization of the portion of memory currently allocated to the cache, using a memory manager separate from the global cache manager for:
  - determining that the application has ceased utilization of the portion of memory; and
  - deallocating the portion of memory, wherein the memory manager is configured to execute while resident in a non-application space of the mobile device, and wherein the non-application space is distinct from the application space.

15. The article of manufacture of claim 14, wherein the memory manager comprises a garbage collector, and wherein determining that the application has ceased utilization of the portion of memory comprises determining, using the garbage collector, that the application has ceased utilization of the portion of memory; and wherein deallocating the portion of memory comprises deallocating the portion of memory using the garbage collector.

16. The article of manufacture of claim 13, wherein the application comprises a plurality of threads, wherein each thread of the plurality of threads is configured to perform one or more tasks for the application, wherein the plurality of threads comprises a plurality of caching threads, wherein each caching thread is configured to utilize a cache to perform the one or more tasks for the caching thread, wherein the plurality of caching threads comprises one or more registered caching threads, and wherein each registered caching thread is configured to be registered with the global cache manager.

17. The article of manufacture of claim 16, wherein the functions further comprise:
- for each registered caching thread, registering the registered caching thread with the global cache manager; and
- wherein instructing the application to cease utilization of the portion of memory currently allocated to the cache comprises instructing each registered caching thread of the one or more registered caching threads to cease utilization of a respective portion of its respective cache.

18. The article of manufacture of claim 13, wherein instructing the application to cease utilization of the portion of memory currently allocated to the cache comprises instructing the application to cease utilization of a predetermined percentage of the portion of memory currently allocated to the cache.

19. The article of manufacture of claim 13, wherein the triggering event is an event selected from the group consisting of: an insertion event requesting to insert a requested amount of memory into the cache, a memory-allocation notification event, and a timer expiration event.

20. The article of manufacture of claim 13, wherein the threshold amount is specified as a predetermined percentage of the memory limit.

21. A method, comprising:
- receiving, at a global cache manager associated with a mobile device, an indication of a triggering event related to memory allocated for an application, wherein the mobile device comprises a non-application space and an application space, wherein the non-application space is distinct from the application space, and wherein the non-application space is configured to store an operating system of the mobile device;
- responsively determining, using the global cache manager, an amount of memory currently allocated to the application, wherein the global cache manager is configured to manage a cache of memory for one or more applications, wherein the one or more applications comprise the application, and wherein the global cache manager and the one or more applications are configured to execute while resident in an application space of the mobile device;
- determining, using the global cache manager, whether a memory limit for the application is within a threshold amount of being exceeded by the amount of memory currently allocated to the application, wherein the global cache manager is distinct from the application; and
- responsive to determining that the memory limit for the application is within the threshold amount of being exceeded, the global cache manager instructing the application to cease utilization of a portion of memory currently allocated to the cache.

22. The method of claim 21, wherein the mobile device further comprises a memory manager that is separate from the global cache manager, wherein the memory manager is configured to be executed while resident in a non-application space of the mobile device, and wherein the non-application space is distinct from the application space.

* * * * *